(12) United States Patent
Haynes et al.

(10) Patent No.: US 11,928,943 B2
(45) Date of Patent: Mar. 12, 2024

(54) SYSTEMS AND METHODS FOR MONITORING, TRACKING AND TRACING LOGISTICS

(71) Applicant: Stress Engineering Services, Inc., Mason, OH (US)

(72) Inventors: Clinton A. Haynes, Mason, OH (US); Joseph Krumme Bullard, West Chester, OH (US); Daniel L. Morrow, Batavia, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

(21) Appl. No.: 18/234,922

(22) Filed: Aug. 17, 2023

(65) Prior Publication Data

US 2023/0394945 A1 Dec. 7, 2023

Related U.S. Application Data

(63) Continuation of application No. 18/115,022, filed on Feb. 28, 2023, now Pat. No. 11,776,370, which is a continuation of application No. 17/949,252, filed on Sep. 21, 2022, now Pat. No. 11,620,890, which is a continuation of application No. 17/057,977, filed as application No. PCT/US2019/034821 on May 31, 2019, now Pat. No. 11,468,755.

(60) Provisional application No. 62/806,444, filed on Feb. 15, 2019, provisional application No. 62/679,300, filed on Jun. 1, 2018.

(51) Int. Cl.
*G08B 13/24* (2006.01)
*G06Q 10/0833* (2023.01)
*G08B 25/08* (2006.01)

(52) U.S. Cl.
CPC ..... *G08B 13/2462* (2013.01); *G06Q 10/0833* (2013.01); *G08B 25/08* (2013.01)

(58) Field of Classification Search
CPC ................................. G08B 13/2462
See application file for complete search history.

(56) References Cited

U.S. PATENT DOCUMENTS

| | | |
|---|---|---|
| 5,610,587 A | 3/1997 | Fujiuchi et al. |
| 6,747,558 B1 | 6/2004 | Thorne et al. |
| 7,097,217 B2 | 8/2006 | Chesser et al. |
| 7,227,467 B2 | 6/2007 | Feibelman |
| 7,239,238 B2 | 7/2007 | Tester et al. |
| 7,453,370 B2 | 11/2008 | Marsilio et al. |
| 7,478,847 B2 | 1/2009 | Kleynerman et al. |
| 7,518,521 B2 | 4/2009 | Feibelman et al. |
| 8,044,806 B2 | 10/2011 | Sayegh |

(Continued)

FOREIGN PATENT DOCUMENTS

| | | |
|---|---|---|
| BE | 1022103 B1 | 2/2016 |
| CA | 2622585 C | 1/2011 |

(Continued)

OTHER PUBLICATIONS

"Three-state RFID Seals", Leghorn Group, https://www.youtube.com/watch?v=5yZPw4ZerRI&t=61s, Jul. 2, 2020.

(Continued)

*Primary Examiner* — Travis R Hunnings
(74) *Attorney, Agent, or Firm* — Frost Brown Todd LLP

(57) ABSTRACT

Methods for tracking a container with a tracking device are provided.

19 Claims, 16 Drawing Sheets

(56) References Cited

U.S. PATENT DOCUMENTS

| | | |
|---|---|---|
| 8,228,192 B2 | 7/2012 | Eckert et al. |
| 8,578,743 B2 | 11/2013 | Yu |
| 8,963,712 B2 | 2/2015 | Mullis et al. |
| 9,032,764 B2 | 5/2015 | Yeh |
| 9,121,195 B2 | 9/2015 | Mullis et al. |
| 9,177,491 B2 | 11/2015 | Azzalin et al. |
| 9,281,603 B2 | 3/2016 | Cullins |
| 9,558,682 B2 | 1/2017 | Dreisbach et al. |
| 9,677,300 B2 | 6/2017 | Mullis et al. |
| 9,697,711 B2 | 7/2017 | McIntosh |
| 9,704,092 B2 | 7/2017 | Held |
| 9,745,782 B2 | 8/2017 | Mubarak |
| 10,417,890 B2 | 9/2019 | Schomacker |
| 10,480,216 B2 | 11/2019 | Lim et al. |
| 10,497,289 B2 | 12/2019 | Debrody et al. |
| 10,510,272 B1 | 12/2019 | Chen |
| 10,550,608 B2 | 2/2020 | Lam |
| 10,774,566 B2 | 9/2020 | Long et al. |
| 10,822,831 B2 | 11/2020 | Wang |
| 11,107,335 B2 | 8/2021 | Lamontagne et al. |
| 11,199,025 B2 | 12/2021 | Lai |
| 11,255,110 B2 | 2/2022 | Fan |
| 11,268,303 B2 | 3/2022 | Yu et al. |
| 11,386,814 B2 | 7/2022 | Sundholm |
| 11,391,063 B2 | 7/2022 | Lai |
| 11,392,885 B1 * | 7/2022 | Leung ............... G06Q 10/0832 |
| 11,403,928 B2 | 8/2022 | Miettinen et al. |
| 11,403,971 B2 | 8/2022 | Grapsa et al. |
| 11,468,755 B2 * | 10/2022 | Haynes ............. G08B 13/2462 |
| 11,566,445 B2 | 1/2023 | Strang |
| 11,620,890 B2 | 4/2023 | Haynes et al. |
| 11,640,754 B2 | 5/2023 | Napthine |
| 11,773,626 B2 | 10/2023 | Bullard et al. |
| 11,776,370 B2 | 10/2023 | Haynes et al. |
| 2005/0231365 A1 | 10/2005 | Tester et al. |
| 2010/0141455 A1 | 6/2010 | Stefanelli |
| 2011/0246067 A1 | 10/2011 | Markham et al. |
| 2014/0067313 A1 | 3/2014 | Breed |
| 2016/0335864 A1 | 11/2016 | Sayegh et al. |
| 2020/0097902 A1 * | 3/2020 | Anders ............. G08B 21/0261 |
| 2021/0201643 A1 * | 7/2021 | Haynes ............. G06Q 10/0833 |
| 2022/0051182 A1 * | 2/2022 | Fox ........................ G08B 15/02 |
| 2022/0101759 A1 | 3/2022 | Ribo |
| 2022/0414410 A1 | 12/2022 | Zhao |
| 2023/0017993 A1 | 1/2023 | Haynes et al. |
| 2023/0087846 A1 | 3/2023 | Cotte |
| 2023/0145788 A1 | 5/2023 | Lan et al. |
| 2023/0212879 A1 | 7/2023 | Yu |

FOREIGN PATENT DOCUMENTS

| | | |
|---|---|---|
| CN | 206471064 U | 9/2017 |
| CN | 209149693 U | 7/2019 |
| EP | 1172781 A1 | 1/2002 |
| EP | 3364333 B1 | 4/2022 |
| ES | 2681070 B1 | 6/2019 |
| IT | 20140006 U1 | 1/2016 |
| JP | 6767586 B2 | 10/2020 |
| RU | 2378470 C1 | 1/2010 |
| WO | 2019232314 A1 | 12/2019 |
| WO | 2020192914 A1 | 10/2020 |
| WO | 2021044337 A1 | 3/2021 |
| WO | 2021144806 A1 | 7/2021 |
| WO | 2023158624 A2 | 8/2023 |

OTHER PUBLICATIONS

"3 States RFID Seals", LeghornGroup srl, Tuscany, Italy, 12 pages, creation date indicated as Sep. 14, 2021.

"Leghorn Myrmidon Seal Teardown", prepared by Applicant Stress Engineering Services, Inc., illustrating and describing components and operation of Myrmidon Seal marketed by LeghornGroup as of Jul. 2, 2020.

* cited by examiner

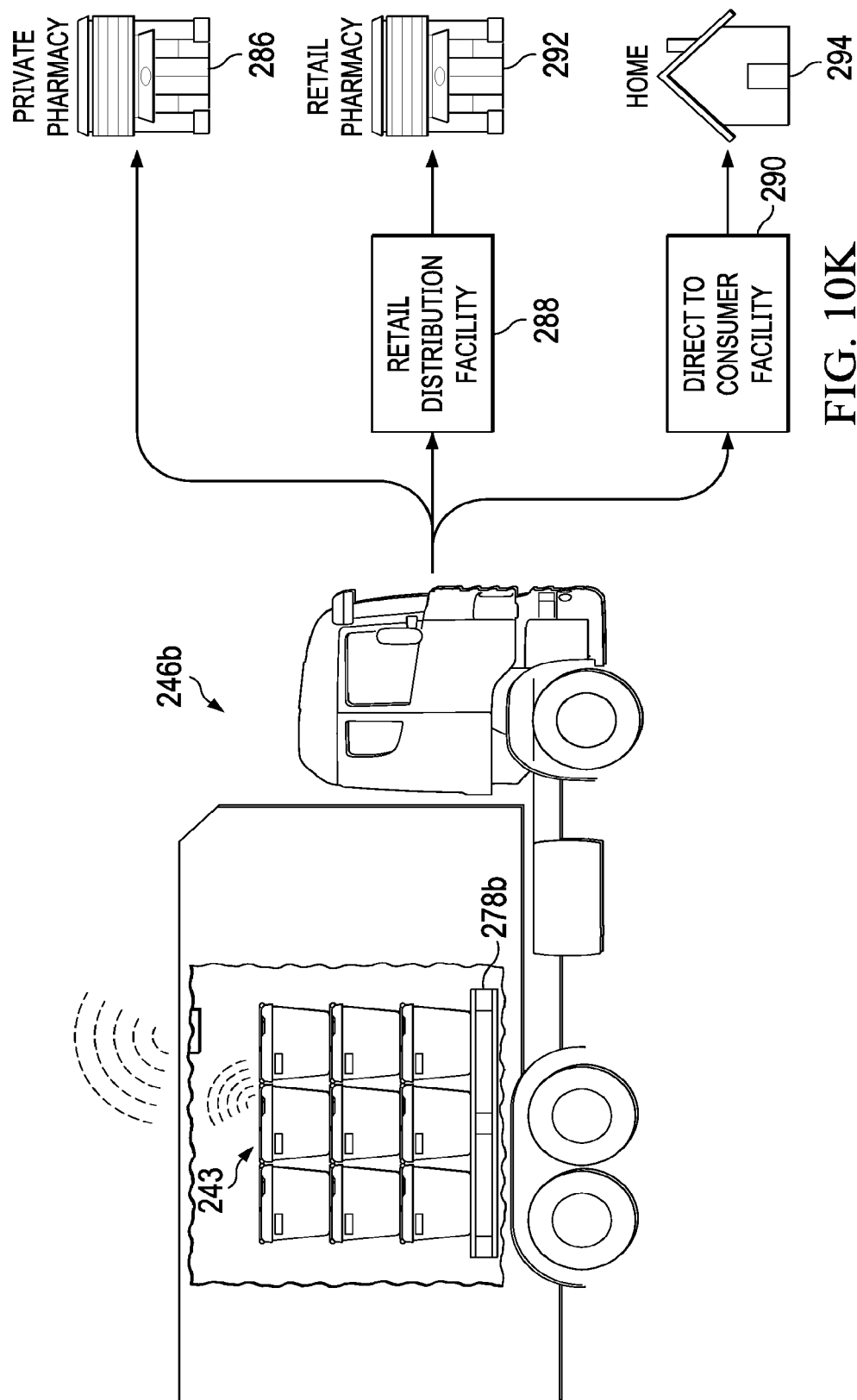

SYSTEMS AND METHODS FOR MONITORING, TRACKING AND TRACING LOGISTICS

REFERENCE TO RELATED APPLICATIONS

This application claims priority of U.S. nonprovisional patent application Ser. No. 18/115,022 filed Feb. 28, 2023, which is a continuation of U.S. nonprovisional patent application Ser. No. 17/949,252 filed Sep. 21, 2022, which is a continuation of U.S. nonprovisional patent application Ser. No. 17/057,977, which is a U.S. National Stage Entry of Patent Cooperation Treaty application Serial No. PCT/US2019/034821, entitled Systems and Methods for Monitoring, Tracking and Tracing Logistics, filed May 31, 2019, and which claims priority of U.S. provisional patent application Ser. No. 62/679,300, entitled Systems and Methods for Monitoring, Tracking and Tracing Logistics, filed Jun. 1, 2018, and U.S. provisional patent application Ser. No. 62/806,444, entitled Systems and Methods for Monitoring, Tracking and Tracing Logistics, filed Feb. 15, 2019, and hereby incorporates each of these by reference herein in its respective entirety.

TECHNICAL FIELD

The apparatus and methods described below generally relate to a tracking device for a parcel.

BACKGROUND

When a parcel is shipped, it can be susceptible to being stolen and/or mishandled.

BRIEF DESCRIPTION OF THE DRAWINGS

Various embodiments will become better understood with regard to the following description, appended claims and accompanying drawings wherein:

FIGS. 10A-10K are each environmental views depicting a different stage of a method for tracking shipping of an item with a tracking device along a pharmaceutical distribution network;

DETAILED DESCRIPTION

Figure 2:
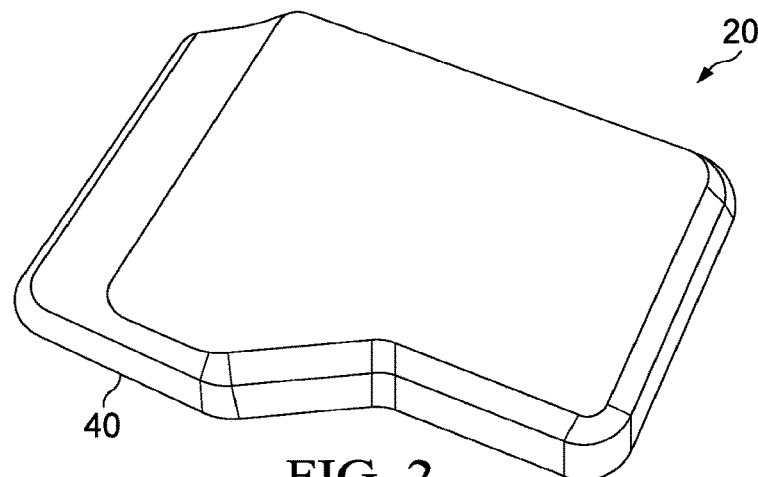
FIG. 2 is an assembled isometric view of the tracking device of FIG. 1.
Figure 1:
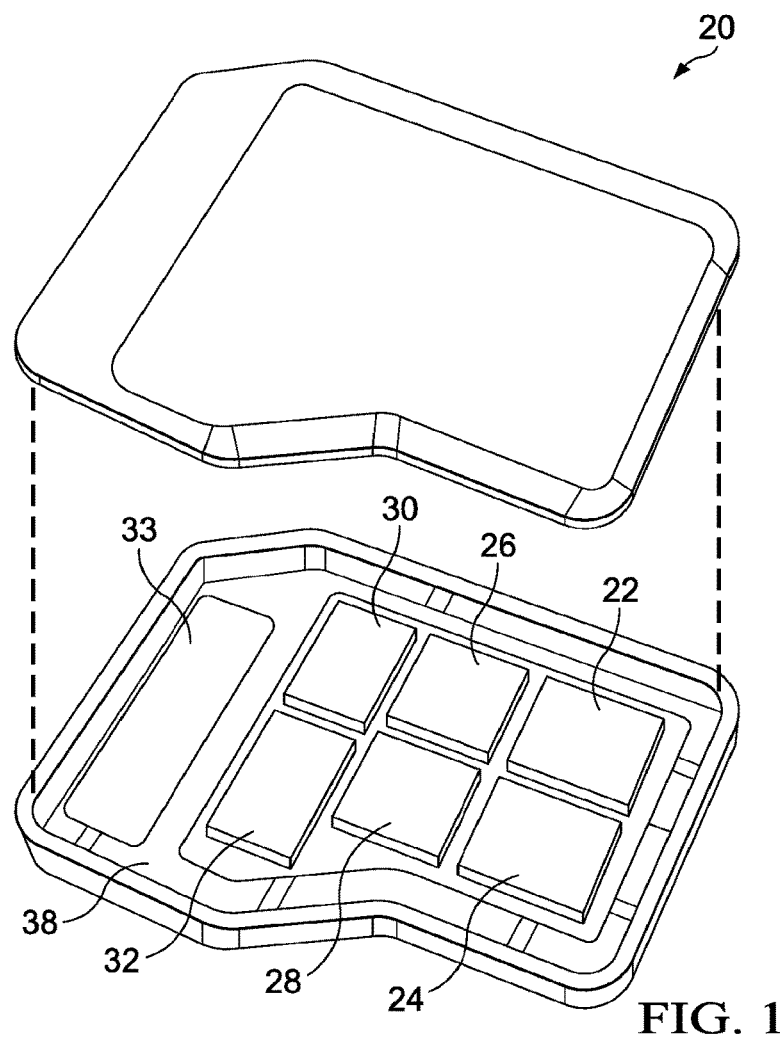
FIG. 1 is an isometric, exploded view depicting a tracking device, in accordance with one embodiment.
Figure 3:
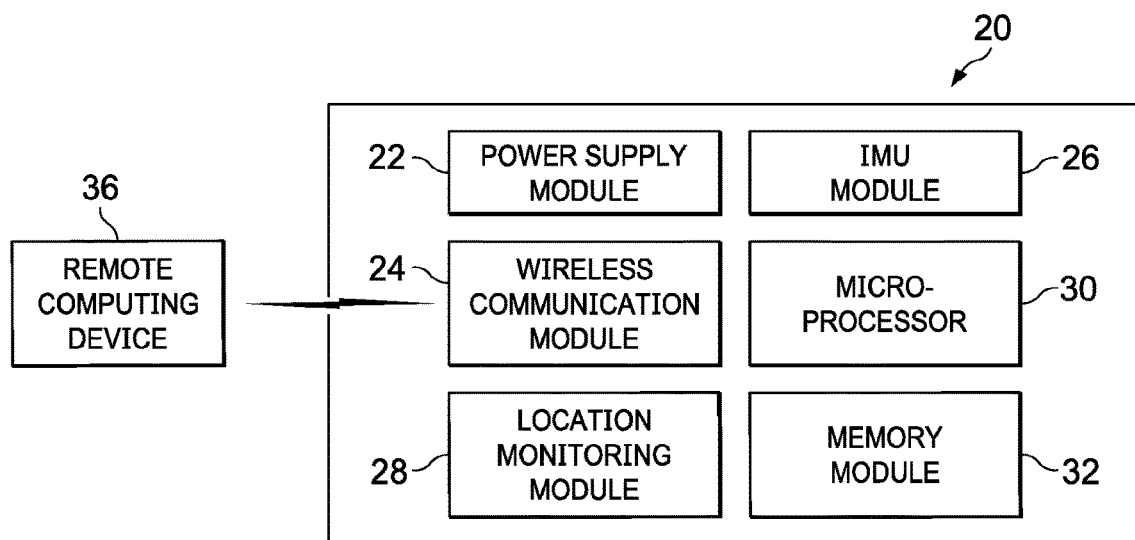
FIG. 3 is a schematic view of the tracking device of FIG. 1 in communication with a remote computing device.

Embodiments are hereinafter described in detail in connection with the views and examples of FIGS. 1-12, wherein like numbers indicate the same or corresponding elements throughout the views. A tracking device 20 in accordance with one embodiment is generally depicted in FIGS. 1-3 and can be associated with a parcel (e.g., 42 in FIG. 4A), as will be described in further detail below, to facilitate tracking of the parcel. As illustrated in FIGS. 1 and 3, the tracking device 20 can include a power supply module 22, a wireless communication module 24, an inertial measurement unit (IMU) module 26, a location-monitoring module 28, a microprocessor 30 (e.g., a processor), and a memory module 32. The power supply module 22 can facilitate onboard powering of the tracking device 20 and can comprise a power storage device such as a disposable battery, a rechargeable battery, a supercapacitor or any of a variety of suitable alternative power storage arrangements. In one embodiment, the power supply module 22 can be charged via inductive charging. In other embodiments, the power supply module 22 can be charged from a power port (not shown) (e.g., a USB port), an onboard photovoltaic cell (not shown), kinetic energy, or from energy harvested from a nearby communication device (e.g., a passively powered device).

The wireless communication module 24 can facilitate wireless communication with a remote computing device 36 via any of a variety of wireless communication protocols such as, for example, Wi-Fi, Cellular, or Wireless Personal Area Networks (WPAN) (e.g., IrDA, Bluetooth, Bluetooth Low Energy, Zigbee, wireless USB). The wireless communication module 24 can be associated with an antenna 33. The remote computing device 36 can be a smartphone (e.g., an iOS or Android device), a laptop computer, a tablet, or a desktop computer, for example. The remote computing device 36 can have an application loaded thereon that is configured to enable unidirectional or bi-directional communication between the tracking device 20 and the remote computing device 36. In some arrangements, the wireless communication module 24 can facilitate communication (e.g., via Wi-Fi or cellular) with a remote server (e.g., a cloud-based server) that is accessed by the remote computing device 36. In one embodiment, the tracking device 20 can be configured to additionally support wired communication via a communication port (not shown), such as a USB port, for example.

The IMU module 26 can be configured to detect motion of the tracking device 20 (e.g., in three dimensions) and can include a gyroscope, an inclinometer, an accelerometer, and/or a magnetometer, for example. The location-monitoring module 28 can be configured to detect the geo spatial positioning of the tracking device 20, using a Global Navigation Satellite System (GNSS), such as GPS, Wi-Fi triangulation, or cellular triangulation. The microprocessor 30 can gather the sensor data and the location data from the IMU module 26 and the location-monitoring module 28, respectively for processing and can wirelessly communicate the sensor data and the location of the tracking device 20 (via the wireless communication module 24) to the remote computing device 36.

The microprocessor 30 may be embodied as any type of processor capable of performing the functions described herein. For example, the microprocessor 30 may be embodied as a single or multi-core processor, a digital signal processor, a microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

The memory module 32 can be embodied as any type of volatile or non-volatile memory or data storage capable of performing the functions described herein. For example, the memory module 32 may be embodied as read only memory (ROM), random access memory (RAM), cache memory associated with the microprocessor 30, or other memories such as dynamic RAM (DRAM), static ram (SRAM), programmable ROM (PROM), electrically erasable PROM (EEPROM), flash memory, a removable memory card or disk, a solid state drive, and so forth. In operation, the memory module 32 may store various data and software used during operation of the tracking device 20 such as operating systems, applications, programs, libraries, and drivers. Further, the memory module 32 may store various data and software associated with a predictive modeling engine, tracking-optimized algorithms, as well as an analytics engine that can be utilized by the tracking device 20 in accordance with the present disclosure. It some embodiments, the microprocessor 30 and the memory module 32 can be integrated into the same chipset (e.g., as a microcontroller).

As illustrated in FIG. 1, a printed circuit board 38 can support the power supply module 22, the wireless communication module 24, the IMU module 26, the location-monitoring module 28, the microprocessor 30, and the memory module 32 described above. The printed circuit board 38 can be disposed within a housing 40 as shown in FIG. 2. In one embodiment, the printed circuit board 38 can be entirely encased within the housing 40 to prevent the printed circuit board 38 from being exposed to environmental conditions. The tracking device 20 can accordingly be a stand-alone, self-contained unit that can be included in a parcel to facilitate tracking of the parcel during shipping. It is to be appreciated that the tracking device 20 can have any of a variety of suitable alternative physical configurations and in some instances can be tailored to accommodate a particular physical implementation.

Figure 4B:
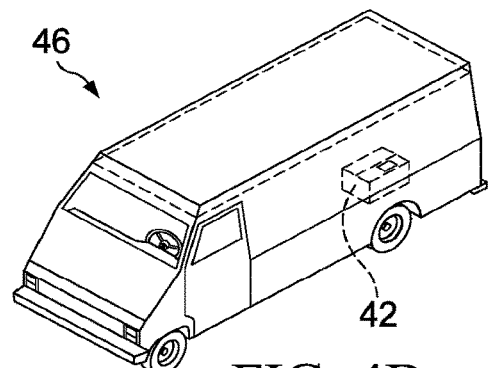
FIGS. 4A-4C are each environmental views depicting a different stage of a method for tracking a parcel with the tracking device of FIG. 1.
Figure 4C:
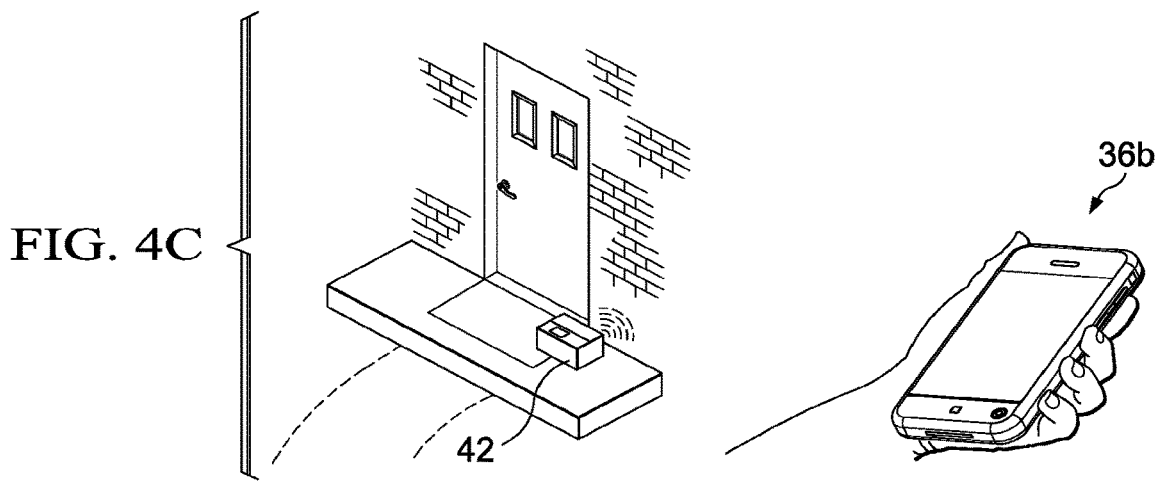
Figure 4A:
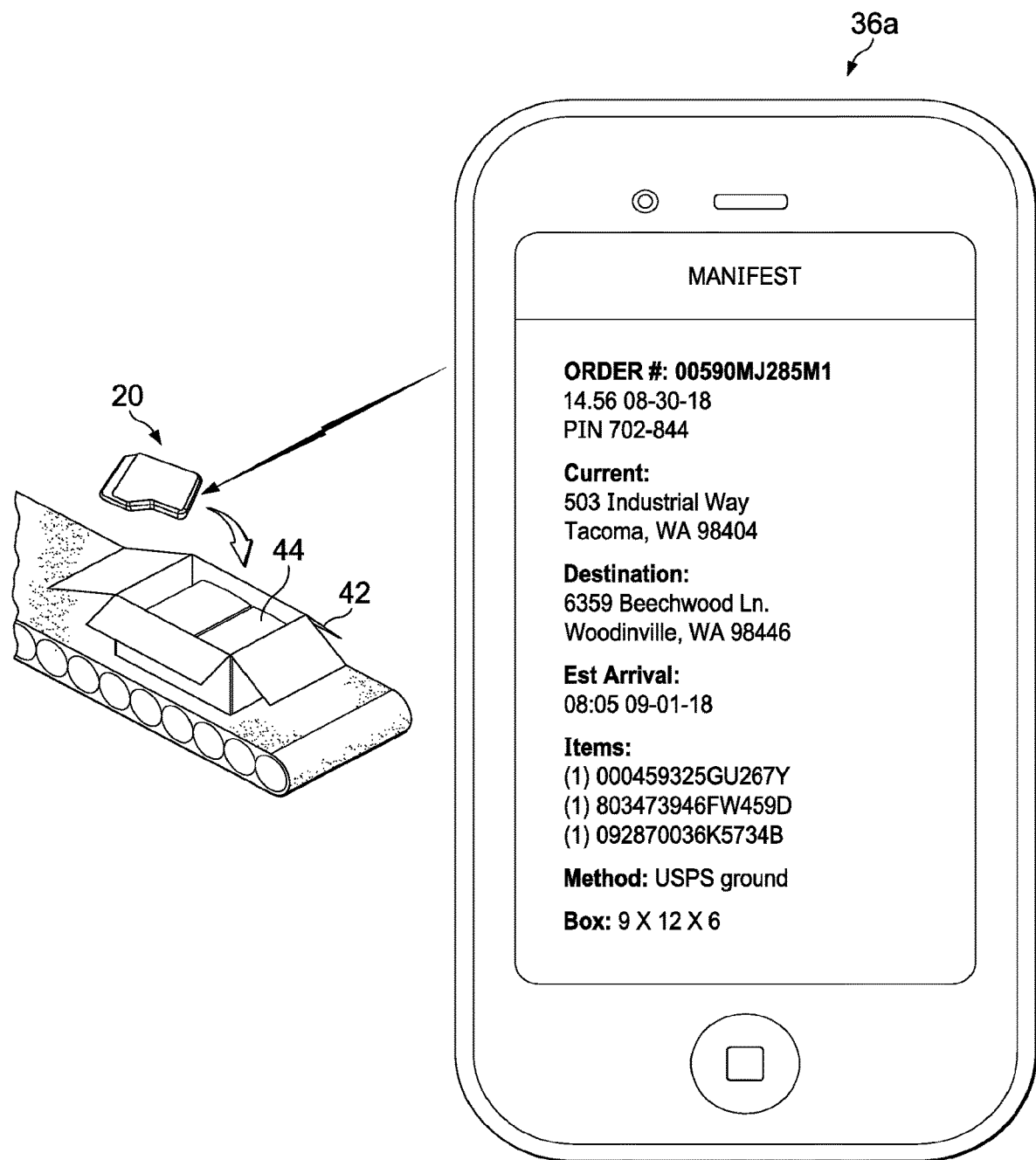

Referring now to FIGS. 4A-6C, one example of a method for tracking a parcel 42 with the tracking device 20 is illustrated and will now be discussed. First, the parcel 42 can be prepared for shipping by first providing contents 44 into the parcel 42 and then providing the tracking device 20 into the parcel 42 together with the contents 44, as illustrated in FIG. 4A. Packing material (not shown), such as packing peanuts or bubble wrap, for example, can also be introduced to the parcel 42 to protect the contents 44 and/or the tracking device 20 from being damaged during shipment. In one embodiment, the tracking device 20 can be provided in a padded envelope (not shown) or other protective container, prior to being introduced into the parcel 42. In another embodiment, the tracking device 20 can be affixed to an interior wall of the parcel 42 (e.g., with an adhesive sticker), to prevent the tracking device from moving freely within the parcel 42 during shipment. Once the tracking device 20 and the contents 44 are provided in the parcel 42, the parcel 42 can be sealed for delivery.

Prior to shipping the parcel 42, the tracking device 20 can be assigned to the parcel 42 (i.e., placed into service) such that it is operable to track the upcoming shipment of the parcel 42. As illustrated in FIG. 4A, a remote computing device 36a can be provided at the shipper's location and can communicate with the tracking device 20, such as, for example, via short-range wireless communication, such as Bluetooth, Zigbee or Wi-Fi; via long-range wireless communication, such as cellular communication; or via wired communication. To facilitate assigning of the tracking device 20 to the parcel 42, a manifest can be generated for the parcel 42 that provides unique details about the parcel 42 and/or the contents 44, such as, for example, an order number, an origination location (i.e., an address), a destination location (i.e., an address), estimated time of arrival at the destination location, a registry of the items that are to be included as the contents 44 of the parcel 42, the method of shipment, and/or the dimensions of the parcel 42. In one embodiment, the manifest can be generated by the remote computing device 36a, but in another embodiment, another remote computing device can generate the manifest and then transmit it to the remote computing device 36a. The remote computing device 36a can then upload the manifest (e.g., as manifest data) to the tracking device 20 which is received by the wireless communication module 24 of the tracking device 20 and then stored in the memory module 32. In one embodiment, the tracking device 20 can require a user to enter login credentials (e.g., with a username and password) at the remote computing device 36a before permitting communication with the tracking device 20. It is to be appreciated that although the remote computing device 36a is shown to be a smartphone, any of a variety of suitable alternative remote computing devices can be provided for communicating with the tracking device 20, such as, for example, a laptop, a desktop, or a stand-alone communication device (i.e., a device that is configured only for communicating with the tracking device 20).

Once the tracking device 20 has been successfully assigned to the parcel 42, it can begin tracking the parcel 42, which will be described in further detail below. As illustrated in FIG. 4B, the parcel 42 can then be loaded onto a delivery vehicle 46 for shipment to the destination location. Although the delivery vehicle 46 is shown in FIG. 4B to be an automobile, other types of delivery vehicles are contemplated, such as an airplane, a train, a tractor-trailer, or a human messenger, for example. It is also contemplated that a combination of different types of delivery vehicles can be utilized to facilitate delivery of the parcel 42 to the destination location.

During shipment of the parcel 42 to the destination location, the tracking device 20 can facilitate tracking of the location (e.g., the geospatial positioning) of the parcel 42 via the location-monitoring module 28. In one embodiment, the tracking device 20 can periodically transmit the current location of the parcel 42 to a remote computing device (e.g., 36) for display to a recipient to facilitate remote tracking of the parcel 42 (e.g., substantially in real-time). In one embodiment, the tracking device 20 can transmit the location of the parcel 42 via cellular communication or any of a variety of suitable alternative long-range wireless networks. In another embodiment, the delivery vehicle 46 can include a repeater (not shown) that communicates with the tracking device 20 via a short-range wireless network (e.g., Bluetooth) and transmits the location of the parcel 42 via a long-range wireless network, such as via cellular communication. In such an embodiment, the tracking device 20 might consume less power than when directly transmitting the location via a long-range wireless network.

In one embodiment, the tracking device 20 can know the predefined route for the shipment (e.g., from the manifest) and can compare the current route with the predefined route. When the parcel 42 is on the predefined route, the tracking device 20 can withhold communication of its current location. However, when the tracking device 20 detects that the parcel 42 has diverged from the predefined route, the tracking device 20 can communicate the location of the parcel 42 periodically to enable a user to more easily locate it. As such, the tracking device 20 able to conserve power by only transmitting the location of the parcel 42 when the parcel 42 has diverted form the predefined route.

The tracking device 20 can additionally or alternatively periodically log the location of the parcel 42 as historical location data in the memory module 32 for use in conducting historical analysis of the route of the parcel 42 (e.g., to determine route inefficiencies, route anomalies, or to assess the ability of a driver).

The tracking device 20 can understand the route of the During tracking of the location of the parcel 42, the tracking device 20 can understand the predefined route from the manifest. preloading of the manifest enables the tracking device to know its location pathway, and to decide for itself whether it is off course, and thus whether a communication is necessary, thereby making it a smart device and capable of saving battery power The tracking device 20 can also facilitate detection of motion-based forces, such as vibration or shock, via the IMU module 26, that the parcel 42 is subjected to during shipping. In one embodiment, when the motion-based forces are excessive (e.g., relative to a threshold value), such as when the parcel 42 is dropped or the delivery vehicle 46 is in an accident, a notification can be sent to the remote computing device 36 to indicate that the parcel 42 may have been damaged. In another embodiment, the motion-based forces can be periodically logged in the memory module 32 as historical environmental data for use in conducting historical analysis of the types of motion-based forces experienced by the parcel 42 during delivery. In one example, the motion-based forces detected by the tracking device 20 can be used to determine the types of conveyance methods (e.g., hand carrying, hand truck, conveyor belt) used during the shipping process to verify that the parcel 42 was properly handled during shipping. It is to be appreciated that, although data is described as being logged in the memory module 32, data collected by the tracking device 20 can additionally or alternatively be logged in a remote server (not shown) periodically during shipping (e.g., via long-range communication such as cellular communication) and/or once the parcel 42 reaches the destination location (e.g., via short-range communication).

During shipping of the parcel 42, the tracking device 20 can compare the current location to the destination location provided in the manifest to determine whether the parcel 42 has been successfully delivered to the destination location, as illustrated in FIG. 4C. In one embodiment, a virtual geographic boundary (e.g., a geofence) can be established for the destination location during the assigning of the tracking device 20 to the parcel 42 (e.g., from the manifest). In such an embodiment, the tracking device 20 can determine that the parcel 42 has been successfully delivered to the destination location once the current location is within the geographic virtual boundary. In another embodiment, geospatial information (e.g., a geospatial coordinate) can be established for each of the current location and the destination location. In such an embodiment, the tracking device 20 can determine that the parcel 42 has been successfully delivered to the destination location once the geospatial information for the current location is within a predefined proximity (e.g., within 100 feet) of the geospatial information for the destination location. In one example, the geospatial information for the destination location can be established during the assigning of the tracking device 20, and the geospatial information for the current location can be established during tracking of the parcel 42.

Once the tracking device 20 determines that the parcel 42 has been successfully delivered to the destination location, as illustrated in FIG. 4C, and the parcel 42 is at rest, the tracking device 20 can enter a supervisory mode in which it monitors the parcel 42 for unauthorized removal from the destination location (e.g., theft). When the tracking device 20 enters the supervisory mode, it can detect any motion of the parcel 42 from rest (e.g., via the IMU module 26) that may indicate potential unauthorized departure from the destination location, such as when the parcel is picked up or shaken. When such motion is detected, the tracking device 20 can then compare the current location with the destination location to determine whether the parcel 42 has departed from the destination location (e.g., relative to the virtual geographic boundary or the predefined proximity described above). If the tracking device 20 determines that the parcel 42 has departed from the destination location, the tracking device 20 can send an alert to a remote computing device 36b and can continue tracking the parcel 42. The tracking device 20 can transmit periodic updates of the current location of the parcel 42 to the remote computing device 36b until the parcel 42 has been successfully recovered. It is to be appreciated that although the remote computing device 36b is shown to be a smartphone, any of a variety of suitable alternative remote computing devices can be provided for communicating with the tracking device 20 upon delivery of the parcel 42, such as, for example, a laptop, a desktop, or a stand-alone communication device (i.e., a device that is configured only for communicating with the tracking device 20 at the destination location).

When the parcel 42 initially arrives at the destination location and is at rest, as determined by the tracking device 20, the tracking device 20 can enter the supervisory mode and can communicate with the remote computing device 36b (e.g., via the wireless communication module 24) to confirm the status of the delivery to the remote computing device 36b. If the remote computing device 36b is proximate enough to the destination location, the tracking device 20 can communicate with the remote computing device 36b via short-range communication, such as via Bluetooth, Zigbee or Wi-Fi. In one embodiment, the manifest provided to the tracking device 20 can include the login credentials for a Wi-Fi network located at the destination location. In such an embodiment, when the parcel 42 is delivered to the destination location, the tracking device 20 can automatically login to the Wi-Fi network at the destination location using the login credentials to enable communication with the remote computing device 36b over the Wi-Fi network. However, if the remote computing device 36b is not proximate enough to the destination location to use short-range communication, the tracking device 20 can transmit the acknowledgement to the remote computing device 36b via long-range communication such as via cellular communication.

Figure 5:
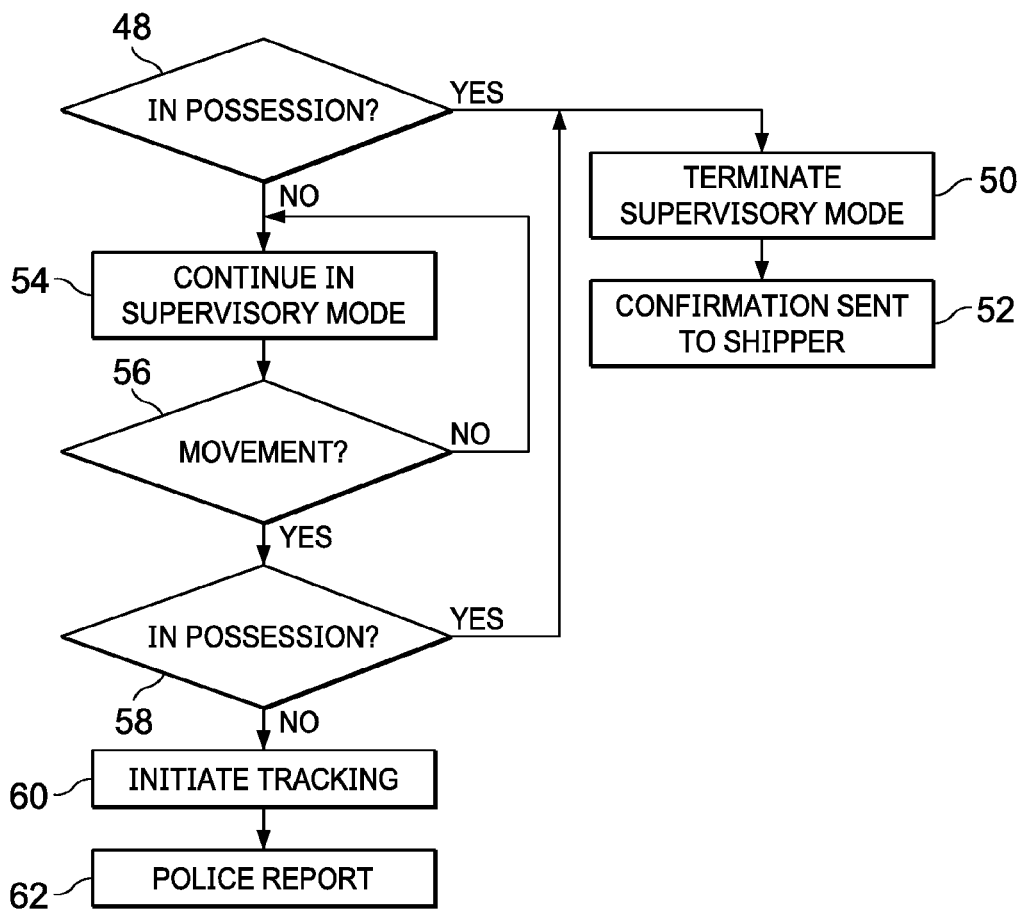
FIG. 5 is a flow chart depicting the operation of the tracking device of FIG. 1 in a supervisory mode.

One example of the operation of the tracking device 20 in the supervisory mode is illustrated in FIG. 5. When the parcel 42 is successfully delivered and the tracking device 20 enters the supervisory mode, the tracking device 20 can query the intended recipient (e.g., via a graphical user interface (GUI) on the remote computing device 36b) to confirm whether the parcel is in the recipient's possession (48). If the recipient confirms that the parcel 42 is in the recipient's possession, the tracking device 20 can stop operating in the supervisory mode (50) and can send a delivery confirmation to the shipper (52) to notify the shipper that the parcel 42 has been successfully delivered to the intended recipient. If the recipient indicates that the parcel 42 is not in the recipient's possession, the tracking device 20 can continue to operate in the supervisory mode (54) until the confirmation is received from the recipient. If the recipient does not provide any indication, the tracking device 20 can continue to operate in the supervisory mode (54). While in the supervisory mode, the tracking device 20 can continue to detect movement of the parcel 42 (56) (e.g., the IMU module 26). If the tracking device does not detect movement of the parcel 42, it can remain in the supervisory mode. In one embodiment, if the tracking device 20 is in the supervisory mode and does not detect movement after a predefined time period has elapsed, it can enter a power conservation mode (e.g., sleep) until it detects movement. When the tracking device 20 detects movement, it can query the intended recipient (e.g., via the GUI on the remote computing device 36b) to confirm whether the parcel is in the recipient's possession (58). If the recipient confirms that the parcel 42 is in the recipient's possession, the tracking device 20 can stop operating in the supervisory mode (50) and can send a delivery confirmation to the shipper (52) to notify the shipper that the parcel 42 has been successfully delivered to the intended recipient. If the recipient indicates that the parcel 42 is not in the recipient's possession, the tracking device 20 can initiate tracking of the parcel 42 (60). In one embodiment, the remote computing device 36b can also display a message indicating that tracking has been initiated. If there is no response from the recipient within a predefined amount of time, the tracking device 20 can initiate tracking of the parcel 42 (60). During tracking of the parcel 42, a report can be transmitted to the police (62). The tracking device 20 can also send periodic updates of the current location of the parcel 42 to the remote computing device 36b which can be displayed to the intended recipient.

Figure 6A:
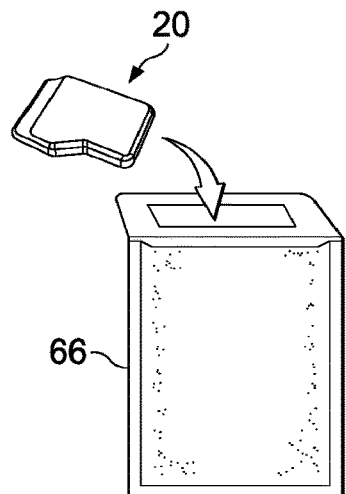
FIGS. 6A-6C are each an environmental view depicting different stages of a method for returning the tracking device of FIG. 1 to a shipper.
Figure 6B:
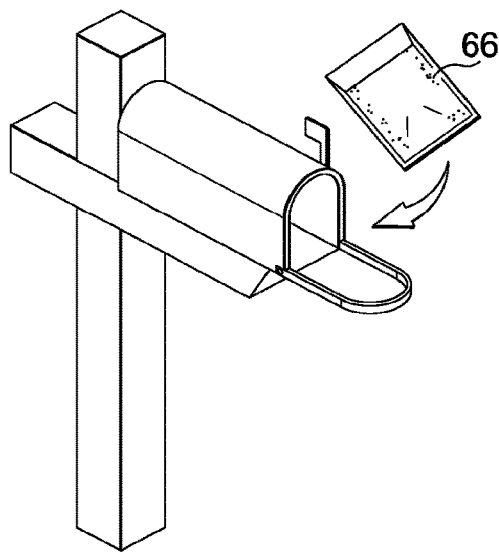
Figure 6C:
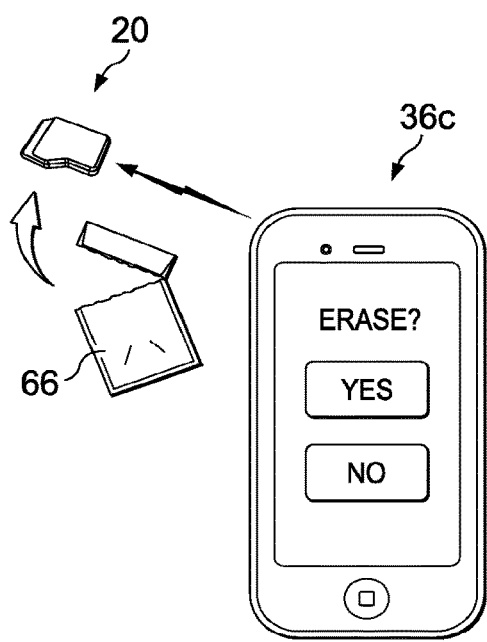

Once the parcel 42 is successfully in the recipient's possession, the tracking device 20 can be removed from the parcel 42 and returned to the shipper (i.e., reverse logistics). One example of a method for returning the tracking device 20 is illustrated in FIGS. 6A-6C and will now be described. First, as illustrated in FIG. 6A, the tracking device 20 can be provided in a padded envelope 66 which can be preprinted with shipping information for returning the tracking device 20 to the shipper. In some embodiments, the tracking device 20 can be provided in the padded envelope 66 prior to shipping the parcel 42 to protect the tracking device 20 during shipment. The padded envelope 66 containing the tracking device 20 can then be shipped back to the shipper, as illustrated in FIG. 6B. Once the padded envelope 66 arrives at the shipper's location, the tracking device 20 can be retrieved from the padded envelope 66, as illustrated in FIG. 6C. As an alternative, tracking devices can be returned to the shipper in bulk. In an alternative embodiment, the tracking device 20 can be configured for one-time use and discarded after the parcel 42 is delivered. A remote computing device 36c can communicate with the tracking device 20 and can query a user about whether to erase the tracking device 20. If a user indicates that the tracking device 20 is to be erased, the remote computing device 36c can transmit a deprogramming instruction to the tracking device 20. In response to the deprogramming instruction, the tracking device 20 can erase the manifest data and any other data stored in the memory module 32, such that the tracking device 20 can be reassigned to another parcel. In one embodiment, the tracking device 20 can facilitate tracking of the return shipment of the padded envelope 66 in a similar manner as described above with respect to FIGS. 4A-4F. It is to be appreciated that although a padded envelope (e.g., 66) is shown and described, any of a variety of suitable alternative protective containers are contemplated.

In one embodiment, the tracking device 20 can require a user to enter login credentials (e.g., with a username and password) at the remote computing device 36c before permitting deprogramming of the tracking device 20. It is to be appreciated that although the remote computing device 36c is shown to be a smartphone, any of a variety of suitable alternative remote computing devices can be provided for communicating with the tracking device 20, such as, for example, a laptop, a desktop, or a stand-alone communication device (i.e., a device that is configured only for communicating with the tracking device 20).

Figure 7:
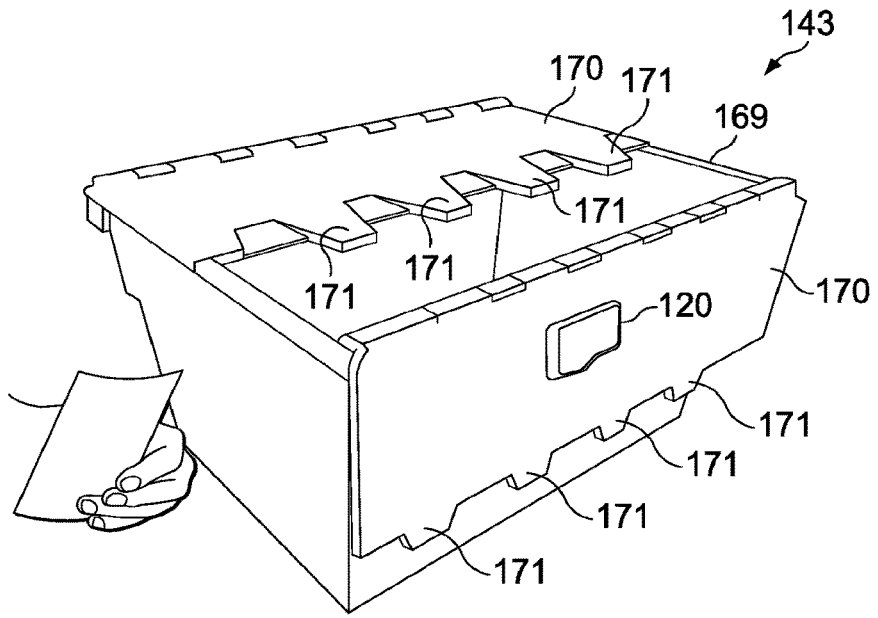
FIG. 7 is an isometric view depicting a tote in association with a tracking device, in accordance with another embodiment.

Referring now to FIGS. 7-9G, an alternative embodiment of a tracking device 120 is shown to be affixed to a reusable, tote-type parcel 143 (hereinafter "the tote"). As illustrated in FIG. 7, the tote 143 can include a receptacle 169 and a pair of closure flaps 170 that can be selectively opened and closed relative to the receptacle 169. The closure flaps 170 can include interlock portions 171 that interlock with each other when the closure flaps 170 are closed to provide a substantially rigid closure therebetween. The tote 143 can be configured to interlock with other similarly configured totes when provided in a stacked arrangement. In one embodiment, the tote 143 can be formed of a high-density thermoplastic material, but any of a variety of suitable alternative materials are contemplated, such as, for example, a high-density elastomeric material, metal or wood. In one embodiment, the tote 143 can comprise an insulated container (e.g., for cold chain shipments). It is to be appreciated that the tote 143 can have any of a variety of suitable alternative configurations. For example, the tote 143 might have a lid that is removable from the receptacle (e.g., 169) and the tracking device 120 can be secured to the receptacle.

The tracking device 120 can be releasably coupled to the tote 143 such that the tracking device 120 is able to remain with the tote 143 over the course of multiple shipments of the tote 143 yet is still capable of being removed (e.g., to allow for maintenance or replacement of the tracking device 120). In one embodiment, the tracking device 120 can be releasably coupled to the tote 143 by an adhesive sticker or a hook and loop fastening arrangement. In another embodiment, the tracking device 120 can be slidably received within a compartment (not shown) that is defined by the tote 143. It is to be appreciated that the tracking device 120 can be releasably coupled with the tote 143 in any of a variety of suitable alternative arrangements. In an alternative embodiment, the tracking device 120 can be permanently affixed to the tote 143 such as through heat welding, for example. In one example, the tracking device 120 can be embedded in the tote 143 (e.g., formed integrally together with the tote 143) such that the tote 143 serves as a housing (e.g., 40) for the tracking device 120.

In one embodiment, as illustrated in FIG. 7, the tracking device 120 can be coupled with one of the closure flaps 170 such that the tracking device 120 is readily accessible when the closure flap 170 is opened, and is contained within the tote 143 when the closure flap 170 is closed. It is to be appreciated however that the tracking device can be provided at any of a variety of suitable locations on the tote 143.

Figure 8:
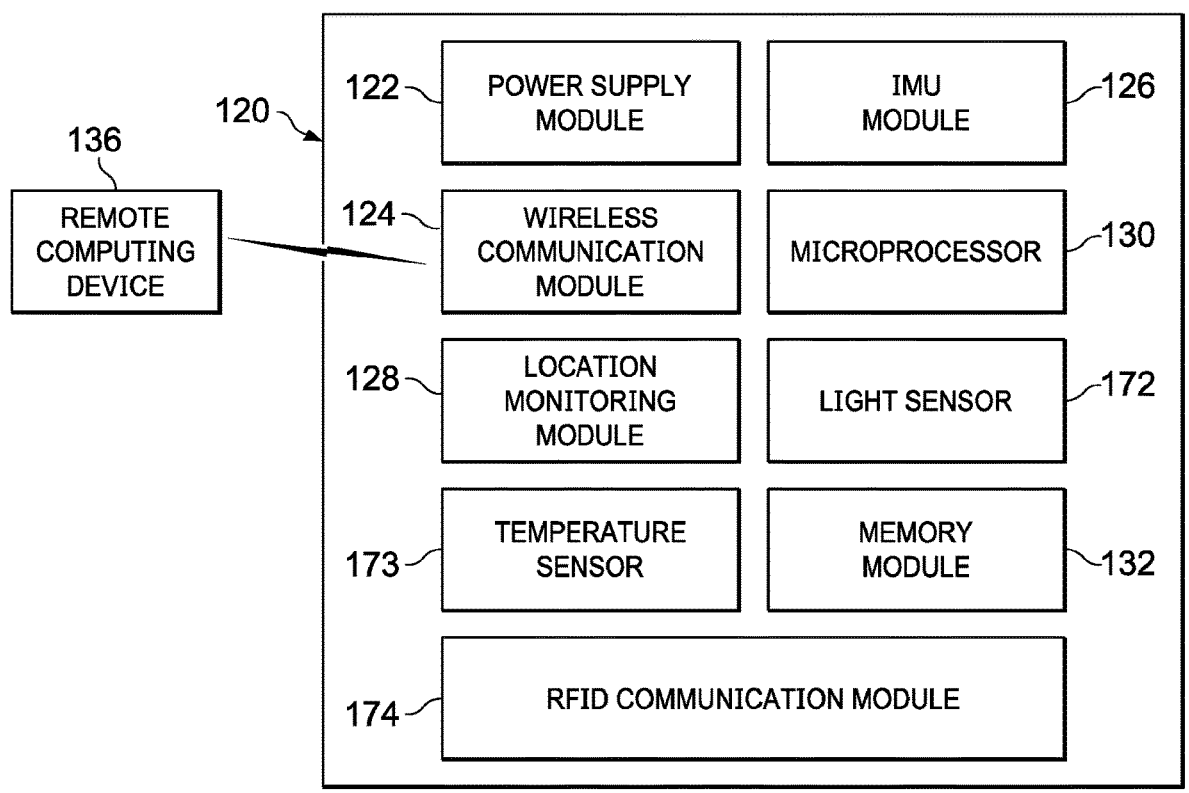
FIG. 8 is a schematic view of the tracking device of FIG. 7 in communication with a remote computing device.

The tracking device 120 can be similar to, or the same in many respects as, the tracking device 20 illustrated in FIGS. 1-6C. For example, as illustrated in FIG. 8, the tracking device 120 can include a power supply module 122, a wireless communication module 124, an inertial measurement unit (IMU) module 126, a location-monitoring module 128, a microprocessor 130 (e.g., a processor), and a memory module 132. The wireless communication module 124 can facilitate communication with a remote computing device 136. However, the tracking device 120 can also include a light sensor 172, a temperature sensor 173, and a radio frequency identification (RFID) communication module 174.

The light sensor 172 can be configured to detect the exposure of the tracking device 120 to light and can comprise a photoresistor, a photodiode, and/or a phototransistor, for example. The light sensor 172 can facilitate detection of the opening and closing of the tote 143 as a function of the amount of light exposure inside of the tote 143. In particular, when the closure flaps 170 are closed, the tracking device 120 can detect the closing of the tote 143 as a function of the reduction in light detected by the light sensor 172. When the closure flaps 170 are opened, the tracking device 120 can detect the opening of the tote 143 as a function of the increased light detected by the light sensor 172.

The temperature sensor 173 can be configured to detect the internal temperature of the tote 143 (e.g., the temperature within the receptacle 169) and can comprise a thermocouple, a resistance temperature detector, a thermistor, and/or a thermal diode integrated circuit, for example. It is to be appreciated that the tracking device 120 can additionally or alternatively include other types of environmental sensors for detecting different environmental conditions within the tote 143, such as, for example, a moisture sensor, a radiation sensor, an air quality/contaminant sensor, and/or a microphone.

In an alternative embodiment, the tracking device 120 can include a fire detection module (not shown) that is configured to facilitate detection of the presence of a fire on or proximate to the tote 143. The fire detection module can be configured to detect heat, smoke, carbon monoxide, or any other environmental condition that may be indicative of a fire. If the tracking device 120 detects the presence of a fire, the tracking device 120 can transmit an alert to a remote computing device (e.g., 136) which can facilitate an expedited response to control/extinguish the fire. The tracking device 120 can accordingly facilitate prompt containment of a fire, which can help alleviate substantial damage to the tote 143 and/or the entire shipment.

The RFID communication module 174 can be configured to interrogate RFID tags that are located in the tote 143, as will be described in further detail below. In one embodiment, the RFID communication module 174 can comprise an RFID reader. In another embodiment, the RFID communication module 174 can comprise an RFID transceiver.

The tracking device 120 can be configured to be selectively programmed (e.g., by the remote computing device 136) to activate or deactivate different ones of the IMU module 126, the location-monitoring module 128, the light sensor 172, the temperature sensor 173, and the RFID communication module 174 for an upcoming shipment. The selection of which of the IMU module 126, the location-monitoring module 128, the light sensor 172, the temperature sensor 173, and the RFID communication module 174 to activate or deactivate can depend on the type of contents that will be shipped in the tote 143 and/or the nature of tracking that will be employed for the tote 143. If the motion of the tote 143 is to be monitored, the IMU module 126 can be activated. If the location of the tote 143 is to be tracked, the location-monitoring module 128 can be activated. If the opening of the tote 143 is to be monitored during shipping, the light sensor 172 can be activated. If the contents are to be shipped in a temperature-controlled environment, the temperature sensor 173 can be activated. If the contents are provided with RFID tags, the RFID communication module 174 can be activated to facilitate interrogation of the RFID tags. The tracking device 120 can accordingly be provided as a general-purpose tracking device that can be uniquely programmed to accommodate a wide range of different shipping scenarios. As such, the tracking device 120 can be more cost effective and easier to implement than conventional single-purpose tracking devices. Additionally, by selectively deactivating the components that are not being used for a particular shipment, the overall power consumption of the tracking device 120 can be reduced, which can prolong battery life such that the tracking device 120 has more longevity for longer shipping routes.

Figure 9A:
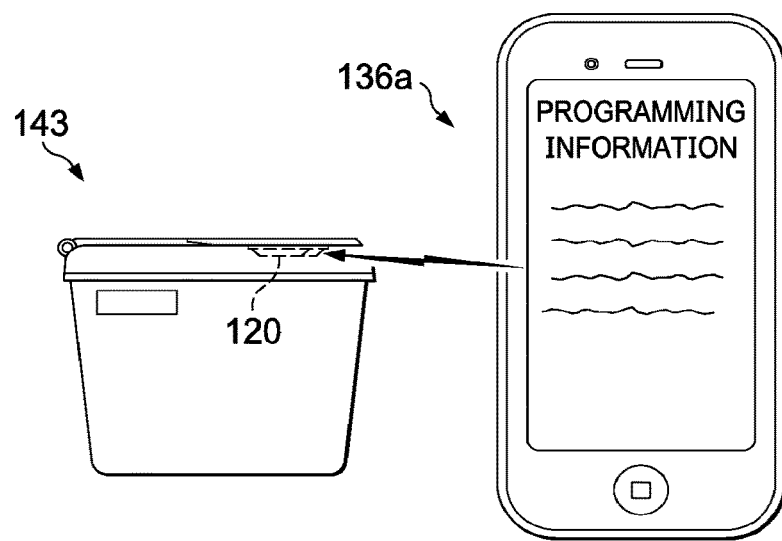
FIGS. 9A-9G are each environmental views depicting a different stage of a method for tracking the tote with the tracking device of FIG. 7.

Referring now to FIGS. 9A-9G, one example of a method for preparing the tote 143 for shipment and tracking the tote 143 with the tracking device 120 is illustrated and will now be discussed. First, a manifest can be generated for a shipment and assigned to a tote 143. In one embodiment, the manifest can be assigned to the tote 143 by including a unique ID for the tote 143 in the manifest. Programming information for the tracking device 120 can then be generated for the tote 143 that specifies which of the IMU module 126, the location-monitoring module 128, the light sensor 172, the temperature sensor 173, and the RFID communication module 174 should be activated or deactivated for the shipment of the tote 143. As illustrated in FIG. 9A, a remote computing device 136a can communicate with the tracking device 120, via short-range wireless communication, such as Bluetooth, Zigbee or Wi-Fi (e.g., when the remote computing device 136a is proximate the tracking device 120), via long-range wireless communication, such as cellular communication (e.g., when the remote computing device 136a is remote from the tracking device 120), or via wired communication. The programming information can be loaded on the remote computing device 136a and uploaded to the tracking device 120 for programming the tracking device 120. In one embodiment, the programming information can be generated by the remote computing device 136a, but in another embodiment, another remote computing device can generate the programming information and then transmit it to the remote computing device 136a. The tracking device 120 can receive the programming information (via the wireless communication module 124) and can then activate or deactivate each of the IMU module 126, the location-monitoring module 128, the light sensor 172, the temperature sensor 173, and the RFID communication module 174 based upon the programming information. For purposes of this discussion, the tracking device 120 can be programmed such that each of the IMU module 126, the location-monitoring module 128, the light sensor 172, the temperature sensor 173, and the RFID communication module 174 are activated. In one embodiment, the tracking device 120 can require a user to enter login credentials (e.g., with a username and password) at the remote computing device 136a before permitting communication with the tracking device 120.

Figure 9B:
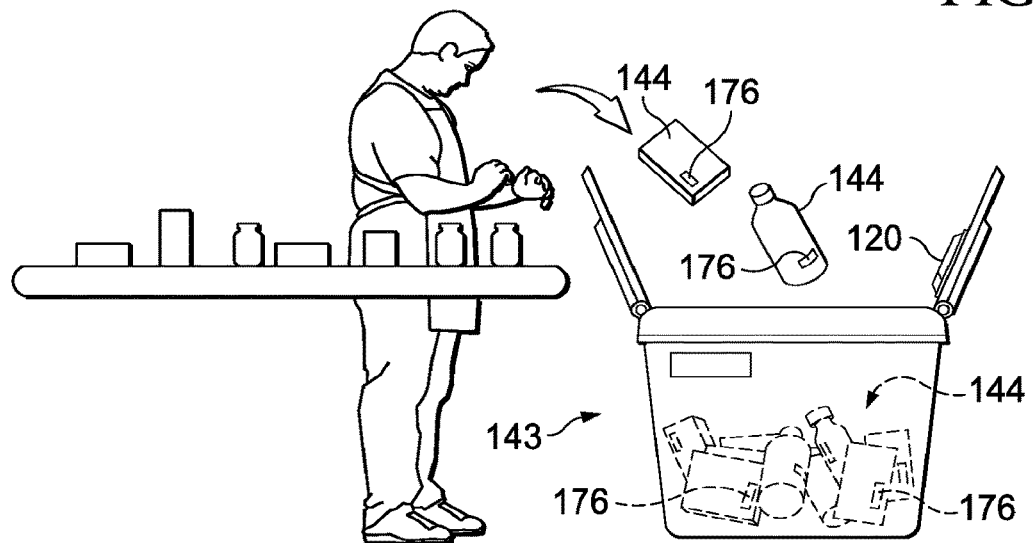

As illustrated in FIG. 9B, once the tracking device 120 has been successfully programmed, the tote 143 can be filled with items 144 (e.g., contents) listed on the manifest that is assigned to the tote 143. Each of the items 144 can include an RFID tag 176 that includes a unique ID and identifying information about the item 144 to which it is affixed (e.g., product name, manufacturer, manufacture date, lot number, and SKU). The unique ID and identifying information about each item can be included in the manifest. As illustrated in FIG. 9C, the manifest can then be uploaded to the tracking device 120 by the remote computing device 136a. It is to be appreciated that although the same remote computing device is shown for uploading the programming information and the manifest to the tracking device, in some embodiments, different remote computing devices can upload the programming information and manifest to the tracking device 120.

Figure 9D:
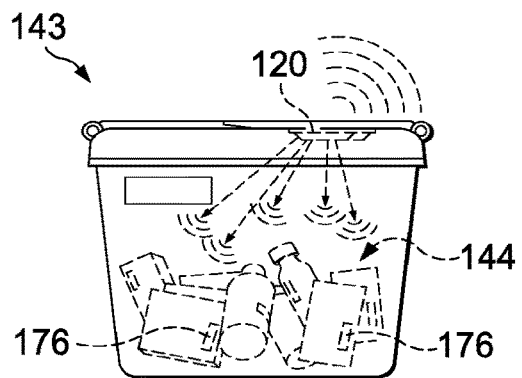
Figure 9C:
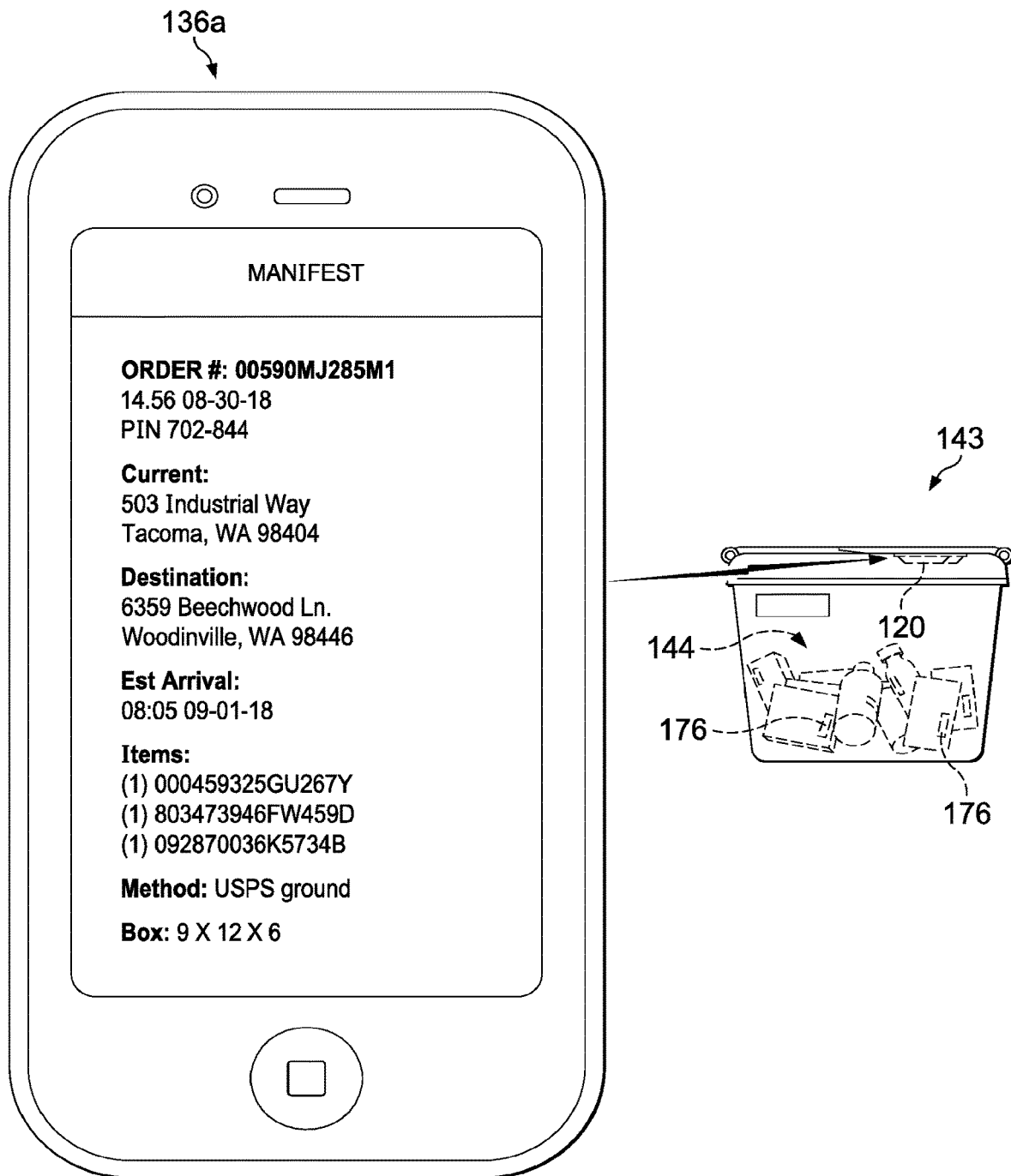

Once the manifest has been uploaded to the tracking device 120, the RFID communication module 174 can interrogate the RFID tags 176 of each of the items 144, as illustrated in FIG. 9D, to take an inventory of which items 144 have been placed in the tote 143. The tracking device 120 can then compare the items 144 identified by the RFID communication module 174 with the items listed on the manifest. If any items listed on the manifest are missing from the tote 143, the tracking device 120 can transmit an alert to the remote computing device 136a indicating that the inventory in the tote 143 does not match the manifest. The tote 143 can be then be retrieved and the inventory error can be corrected. Once all of the items (e.g., 144) listed on the manifest are included in the tote 143, the tote 143 can be ready for shipment.

Although the manifest is described above as being uploaded to the tracking device after filling the tote 143, the manifest can alternatively be uploaded to the tracking device 120 prior to filling the tote 143. In such an embodiment, the RFID communication module 174 can take inventory of the items 144 as they are being placed in the tote (or soon thereafter). When the closure flaps 170 are closed, the tracking device 120 can detect that the tote 143 is now closed (via the light sensor 172) and can compare the inventory with the manifest to determine whether any items (e.g., 144) are missing from the tote 143.

Figure 9E:
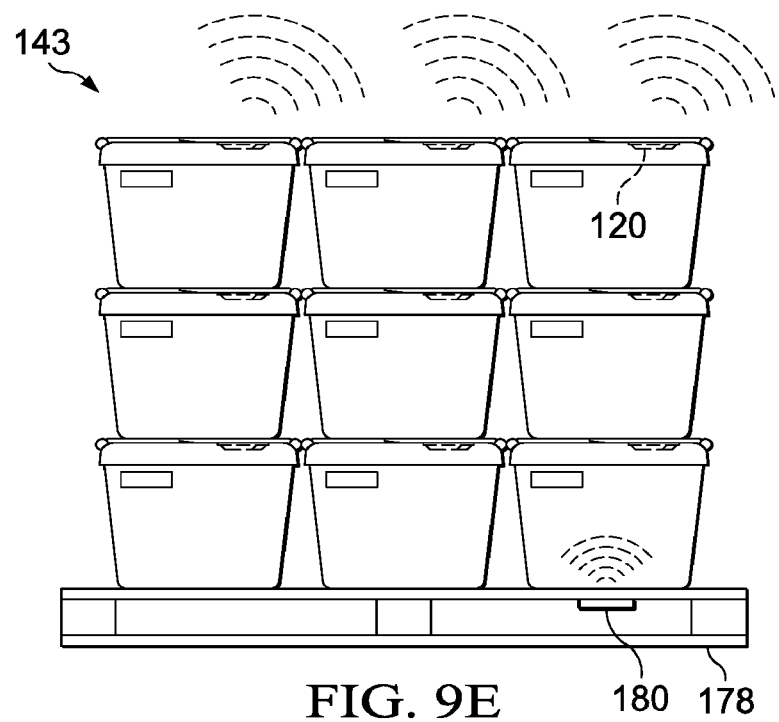

In one embodiment, as illustrated in FIG. 9E, the tote 143 can be palletized on a pallet 178 with other totes that have their own tracking devices (e.g., 120). The pallet 178 can include an RFID communication device 180 and each of the totes can include an RFID tag (not shown) that includes a unique ID. The RFID communication device 180 can itself be configured to serve as a tracking device, and can be provided with a manifest that identifies the specific totes that are to be included on the pallet 178. The RFID communication device 180 can interrogate the RFID tags on the totes to take an inventory of which totes are included on the pallet 178. The RFID communication device 180 can compare the inventory with the manifest. If a tote is missing, the RFID communication device 180 can send an alert (e.g., to the remote computing device 136a) and the pallet 178 can be prevented from being shipped until the missing tote(s) are loaded on the pallet 178.

Figure 9F:
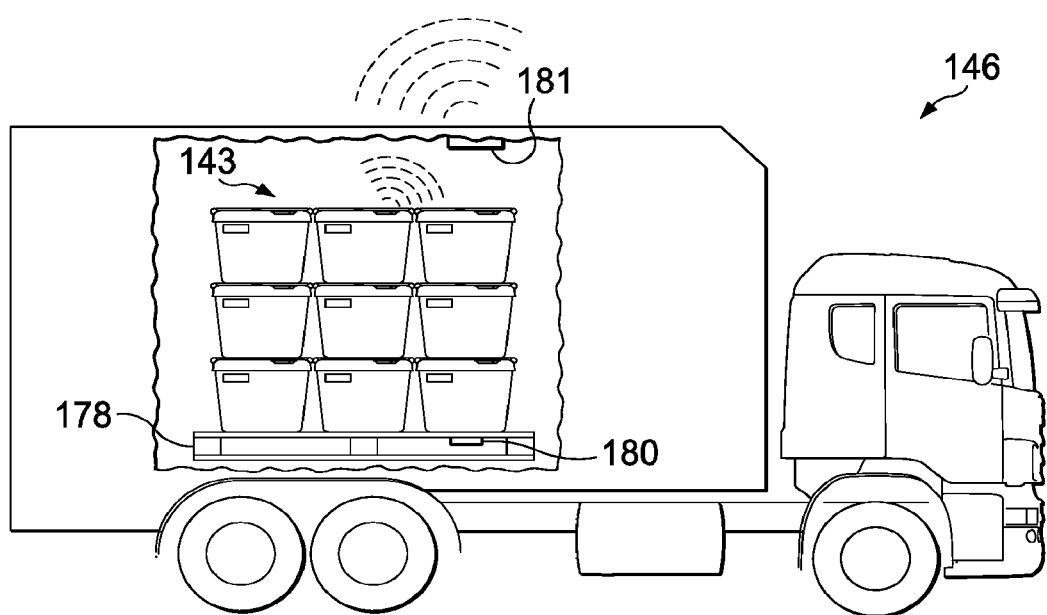

Once the pallet is ready to be shipped to a destination location, it can be loaded into a delivery vehicle 146 for shipment. Although the delivery vehicle 146 is shown in FIG. 9F to be an automobile, other types of delivery vehicles are contemplated, such as an airplane, a train, a tractor-trailer, or a human messenger, for example. It is also contemplated that a combination of different types of delivery vehicles can be utilized to facilitate delivery of the tote 143 to the destination location. In one embodiment, the delivery vehicle 146 can include a repeater 181 that is configured to communicate with the tracking device 120 and/or the RFID communication device 180 via a short-range wireless network (e.g., Bluetooth) and transmit the communication to a remote computing device (e.g., 136a) via a long-range wireless network, such as via cellular communication.

During shipment of the tote 143 to the destination location, the tracking device 120 can facilitate tracking of the location (e.g., the geospatial positioning) of the tote 143 in a similar manner as described above with respect to the tracking device 20. The tracking device 120 can detect the opening of the tote 143 relative to the current location of the tote 143. If the tracking device 120 detects that the tote 143 has been opened (via the light sensor 172) prior to being delivered to the destination location (e.g., determined in a similar manner as described above for the tracking device 20), the tracking device 120 can transmit an alert to a remote computing device (e.g., 136a) indicating that the tote 143 has been opened prior to delivery. In one embodiment, the alert can be transmitted substantially in real time (e.g., via long-range communication). In another embodiment, the alert can be logged in the memory module 132 for transmission to a remote computing device once the tote 143 reaches the destination location (e.g., via short-range communication).

The tracking device 120 can be configured to periodically log the temperature of the tote 143 (e.g., in the memory module 132 or a remote server via long-range communication), as detected by the temperature sensor 173, during shipping to generate a historical temperature report for the tote 143. If the temperature inside the tote 143 reaches a hazardous level for the items 144 (e.g., as specified by the manifest), the tracking device 120 can transmit an alert to a remote computing device (e.g., 136a). In one embodiment, the tracking device 20 can predict an over-temperature condition from the historical report and transmit an alert prior to the over-temperature condition occurring.

The tracking device 120 can be configured to periodically log the motion-based forces (e.g., in the memory module 132 or a remote server via long-range communication), as detected by the IMU module 126, that the tote 143 experiences during shipping to generate a historical report of the different magnitudes and types of motion experienced by the tote 143 during shipping. If the motion-based forces reach a hazardous level for the items 144 (e.g., as specified by the manifest), the tracking device 120 can transmit an alert to a remote computing device (e.g., 136a). In one embodiment, the tracking device 120 can be configured to determine when a hazardous event has occurred, as a function of the motion-based forces detected by the IMU module 126, such as for example, the delivery vehicle 146 being involved in a crash, the delivery vehicle 146 encountering a pot hole, or the tote 143 being dropped. When a hazardous event is determined to have occurred, the tracking device 120 can transmit an alert (e.g., substantially in real time or logged once the tote 143 reaches the destination location) to a remote computing device (e.g., 136a) indicating that a hazardous event has occurred.

The tracking device 120 can be configured to periodically interrogate the tote 143 with the RFID communication module 174 during shipping to confirm whether any of the items 144 listed on the manifest are missing from the tote 143 (e.g., an inventory audit). If any of the items 144 listed on the manifest are missing from the tote 143, the tracking device 120 can transmit an alert to a remote computing device (e.g., 136a) indicating that the inventory in the tote 143 does not match the manifest. In some embodiments, when the tracking device 120 interrogates the tote 143, any neighboring RFID tags (e.g., from adjacent totes on the pallet 178) may inadvertently be interrogated as well. In these embodiments, the tracking device 120 can be configured to only recognize the response signals from the RFID tags 176 of the items 144 listed on the manifest, thus ignoring the stray response signals from any neighboring RFID tags.

The tracking device 120 can conduct an inventory audit in response to certain triggering events such as, for example, when the tote experiences certain types of movement (as detected by the IMU module 126), when certain temperatures are reached inside the tote 143 (as detected by the temperature sensor 173), at specific destinations on the route (as detected by the location-monitoring module 128), or when a hazardous condition occurs. In one embodiment, the tracking device 120 can conduct an inventory audit when the tote 143 is opened (as detected by the light sensor 172). In an alternative embodiment, the tracking device 120 can conduct inventory audits at random times randomly and/or according to a predefined schedule.

The tracking device 120 can log the inventory audits (e.g., in the memory module 132 or a remote server), to create a chain of custody for the items 144 (e.g., a chain of custody log). Additional information, such as the environmental conditions (e.g., the motion-based forces and/or the temperature of the tote 143) and/or the geospatial location during each inventory audit can be included in the chain of custody log.

Figure 9G:
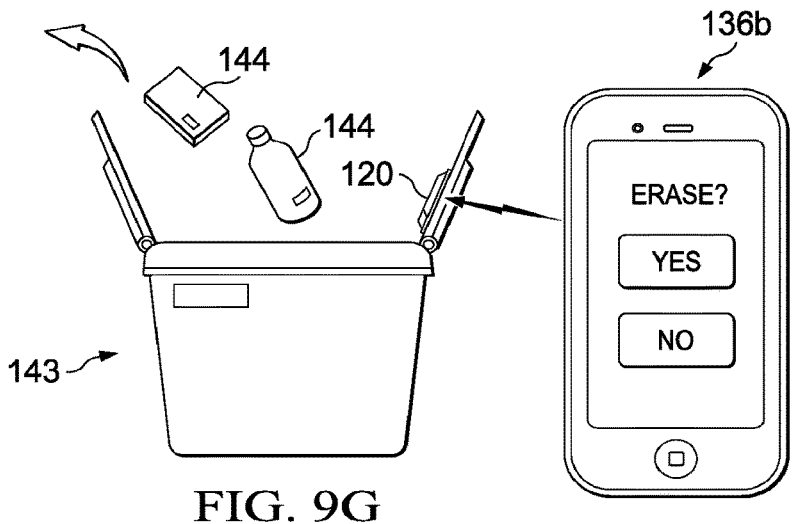

When the tote 143 is delivered to the destination location, the tracking device 120 can determine that successful delivery has occurred and can enter a supervisory mode (e.g., in a similar manner as described above for tracking device 20). While in the supervisory mode, the tracking device 120 can continue to conduct inventory audits, detect for opening and closing of the tote 143, and/or detect for other conditions (e.g., hazardous conditions). Once the tote 143 is successfully in an intended recipient's possession, the supervisory mode can be terminated (e.g., by the recipient). The tote 143 can then be opened and the items 144 can be removed from the tote 143, as illustrated in FIG. 9G. The tracking device 120 can then upload data related to the delivery, such as historical reports, alerts that were generated during shipping, and/or the chain of custody log to a remote computing device 136b. The remote computing device 136b can then request confirmation of whether to erase the tracking device 120. If the recipient indicates that the tracking device 120 is to be erased, the remote computing device 136b can transmit a deprogramming instruction to the tracking device 120, which, in response, erases the programming information, the manifest data and any other data stored in the memory module 132. The tote 143 can then be reused by the recipient for another shipment or can be returned to the shipper. In an embodiment where the tote 143 is returned to the shipper, the tracking device 120 may not be deprogrammed until the shipper receives the tote 143.

It is to be appreciated that although the tracking device 120 is shown and described to be associated with the tote 143, it is to be appreciated that the tracking device 120 can be a stand-alone device (e.g., similar to the tracking device 20) or can be associated with other shipping components, such as a pallet.

Figure 10A:
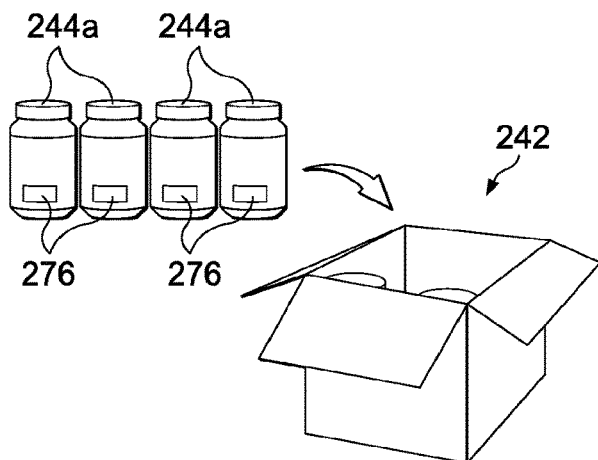
Figure 10B:
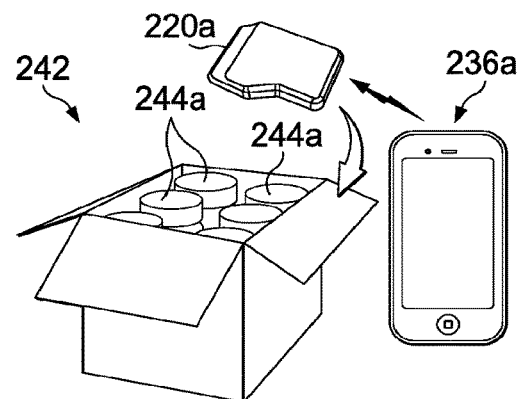
Figure 10C:
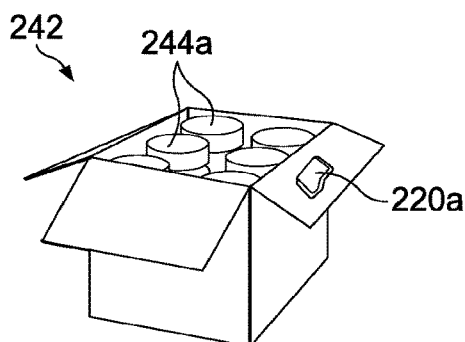
Figure 10D:
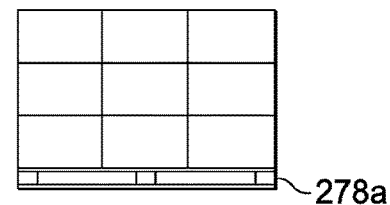
Figure 10E:
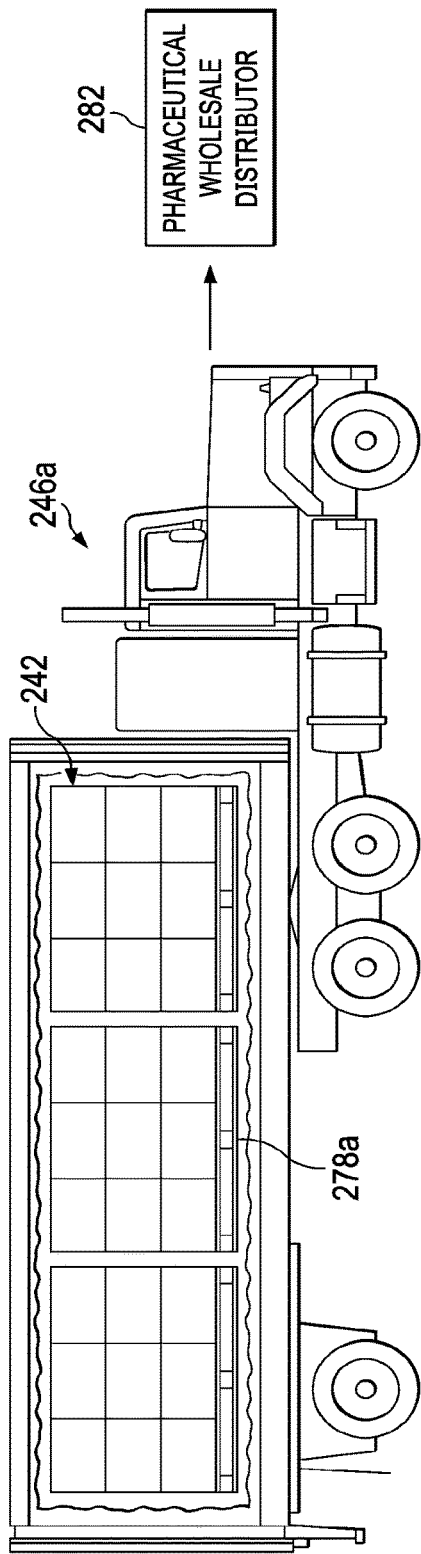
Figure 10F:
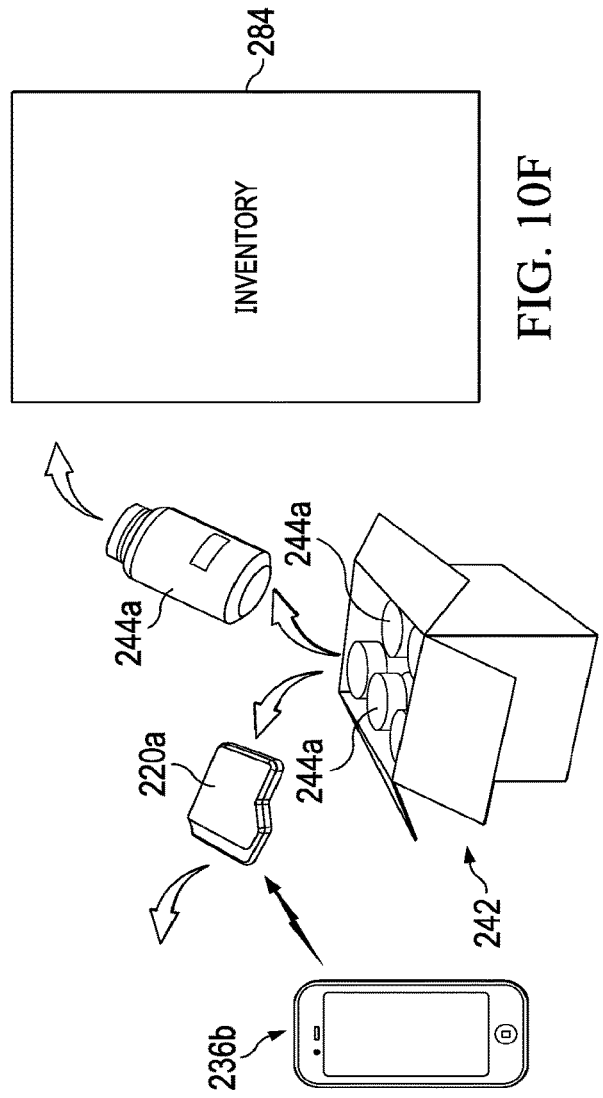

Referring now to FIGS. 10A-10K, one example of a method for tracking a pharmaceutical product through a pharmaceutical distribution channel is illustrated and will now be discussed. It is to be appreciated that the method for tracking a pharmaceutical product can incorporate similar tracking techniques as described above with respect to the tracking devices 20, 120. First, as illustrated in FIG. 10A, a pharmaceutical manufacturer can provide pharmaceutical items 244a (e.g., contents) into a parcel 242 to fulfil an order from a pharmaceutical wholesale distributor (e.g., 282 in FIG. 10E). The pharmaceutical items 244a can include RFID tags 276. As illustrated in FIG. 10B, a tracking device 220a can be programmed and/or assigned to the parcel 242 with a remote communication device 236a. The tracking device 220a can be similar to, or the same as in many respects as, the tracking devices 20, 120 illustrated in FIGS. 1-6C and 7-9G, respectively. For example, the tracking device 220a can include an RFID communication module (e.g., 174) for interrogating the RFID tags 276. As illustrated in FIG. 10C, the tracking device 220a can be affixed to the parcel 242, and the parcel 242 can be closed for shipping. As illustrated in FIG. 10D, the parcel 242 can be palletized on a pallet 278a with other parcels. As illustrated in FIG. 10E, the pallet 278a can be provided in a delivery vehicle 246a for delivery to a pharmaceutical wholesale distributor 282. During shipping of the parcel 242 to the pharmaceutical wholesale distributor 282, the tracking device 220a can track the parcel 242. As part of the tracking, the tracking device 220a can conduct periodic inventory audits to generate a chain of custody log for the pharmaceutical items 244a for the shipment. Once the parcel 242 has been successfully delivered to the pharmaceutical wholesale distributor 282, the tracking device 220a can communicate with a remote computing device 236b, as illustrated in FIG. 10F, to confirm that the parcel 242 has been properly received at the pharmaceutical wholesale distributor 282 (e.g., by confirming delivery with a user and terminating operation in supervisory mode). The tracking device 220a can also upload the chain of custody log for the pharmaceutical items 244a to a remote server (not shown) (e.g., via the remote computing device 236b) as well as any other relevant data (e.g., environmental data and/or alerts) collected during the delivery. The tracking device 220a and the pharmaceutical items 244a can be removed from the parcel 242 at the pharmaceutical wholesale distributor 282, as illustrated in FIG. 10F, the pharmaceutical items 244a can be placed into inventory 284 at the pharmaceutical wholesale distributor 282, and the tracking device 220a can be returned to the pharmaceutical manufacturer.

Figure 10G:
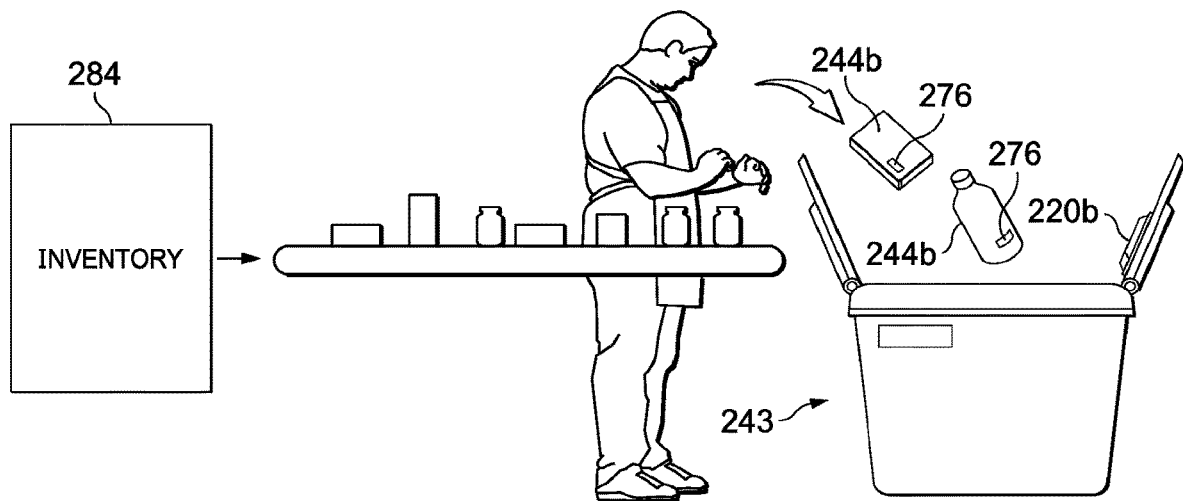
Figure 10H:
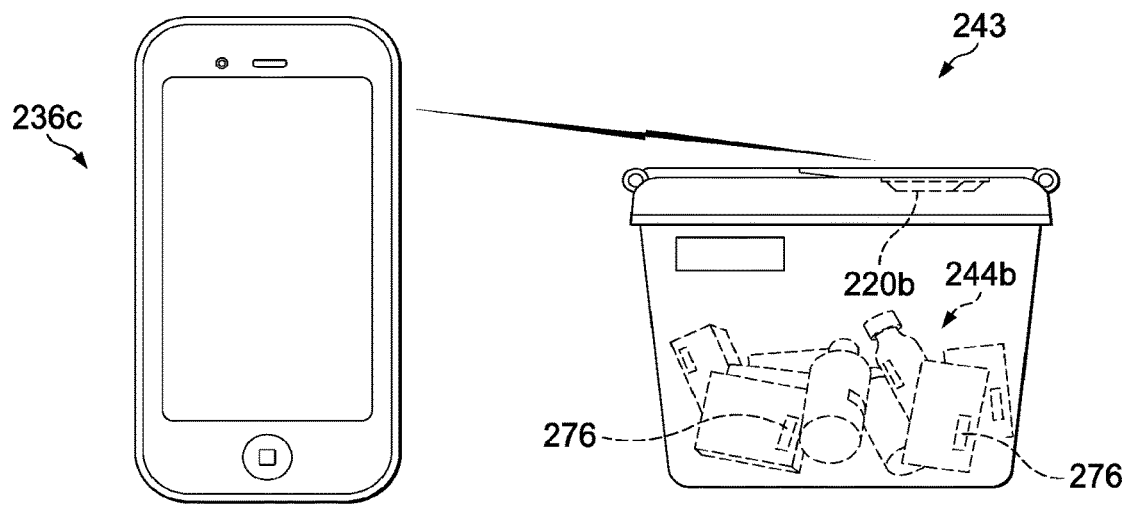
Figure 10I:
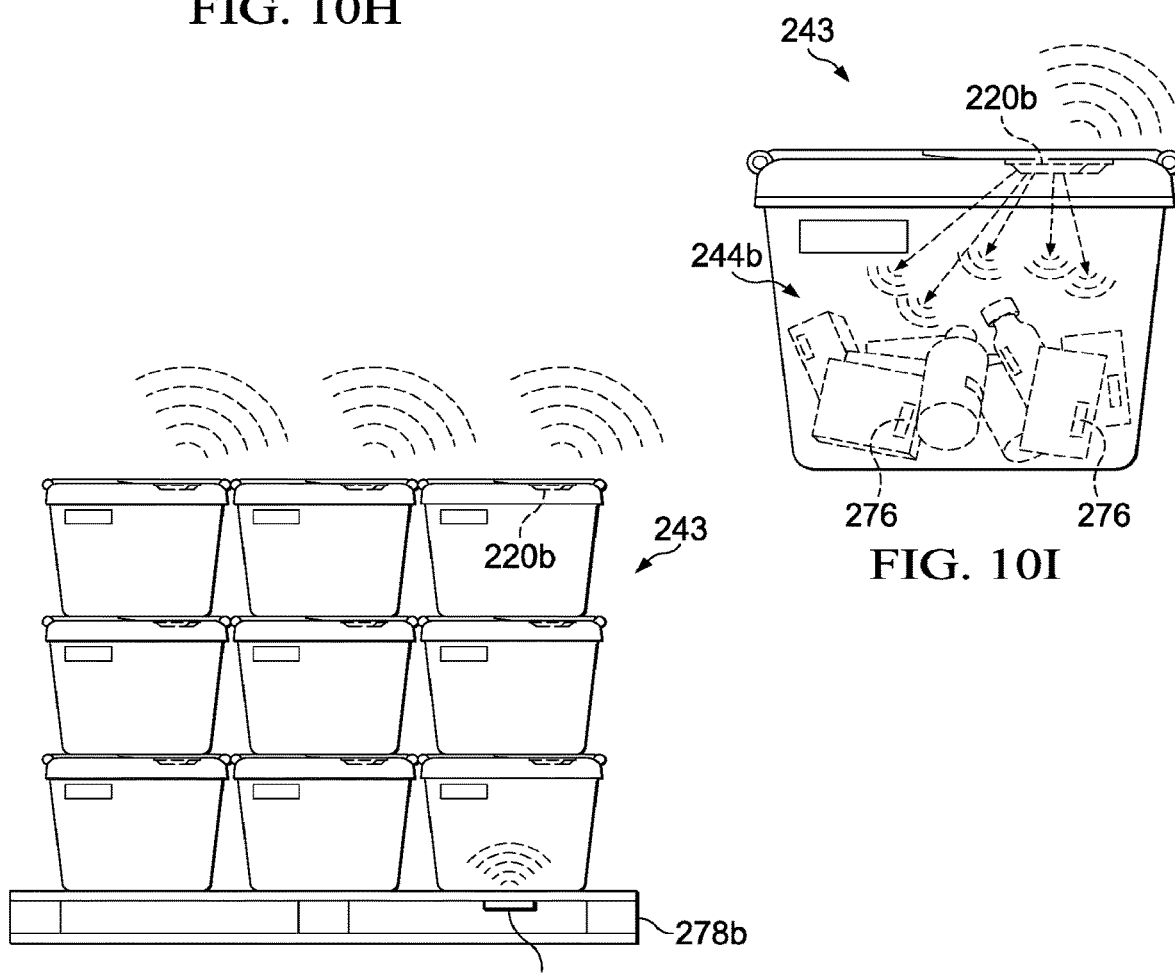
Figure 10J:
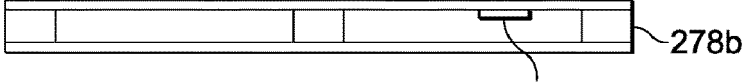

As illustrated in FIG. 10G, pharmaceutical items 244b (which may include some of the pharmaceutical items 244a from the pharmacy manufacturer's shipment) can be retrieved from inventory 284 at the pharmaceutical wholesale distributor (e.g., 282) in response to an order from a pharmacy. The pharmaceutical items 244b can be provided in a tote 243 that is similar to, or the same in many respects as, the tote 143 illustrated in FIGS. 7-9G. A tracking device 220b can be provided on the tote 243 which can be similar to, or the same as in many respects as, the tracking device 220a. The tracking device 220b can be programmed and/or assigned to the tote 243 by a remote communication device 236c, as illustrated in FIG. 10H. Once the tracking device 220b is successfully programmed and/or assigned to the tote 243, the tracking device 220b can begin interrogating the RFID tags 276 on the pharmaceutical items 244b (e.g., to conduct an inventory audit), as illustrated in FIG. 10I. As illustrated in FIG. 10J, the tote 243 can be palletized on a pallet 278b with other totes. The pallet 278b can include an RFID communication device 280 that can interrogate the pallet 278b to take an inventory of which totes are included on the pallet 278b.

As illustrated in FIG. 10K, the pallet 278b can be provided in a delivery vehicle 246b for delivery to one of a private pharmacy 286, a retail distribution facility 288, or a direct to consumer facility 290 (collectively "retail distributors"). During shipping of the tote 243 to one of the retail distributors 286, 288, 290, the tracking device 220b can generate a chain of custody log for the pharmaceutical items 244b. Once the tote 243 has been successfully delivered to one of the retail distributors 286, 288, 290, the tracking device 220b can communicate with a remote computing device (not shown) to confirm that the tote 243 has been properly received at the retail distributor (e.g., 286, 288, 290). The tracking device 220b can also upload the chain of custody log for the pharmaceutical items 244b to a remote server (not shown) (e.g., via the remote computing device 236b) as well as any other relevant data (e.g., environmental data and/or alerts) collected during the delivery.

When the tote 243 is delivered to the private pharmacy 286, the pharmaceutical items 244b can be removed from the tote 243, and the tote 243 can be returned to the pharmaceutical wholesale distributor 282. A pharmacist at the private pharmacy 286 can then facilitate dispensation of the pharmaceutical items 244b to customers. When the tote 243 is delivered to the retail distribution facility 288, the pharmaceutical items 244b can be removed from the tote 243, placed into inventory, and eventually shipped to a retail pharmacy 292. Alternatively, the pharmaceutical items 244b may remain in the tote 243 and the tote 243 can be shipped to the retail pharmacy 292. In either scenario, the shipment to the retail pharmacy 292 can be tracked with a tracking device that generates a chain of custody log for the items in the shipment. When the shipment reaches the retail pharmacy 292, the chain of custody log can be uploaded to a remote server (not shown) (e.g., via a remote computing device), and the tracking device and/or tote can be returned to the pharmaceutical wholesale distributor 282. A pharmacist at the retail pharmacy 292 can then facilitate dispensation of the items from the shipment to customers.

When the tote 243 is delivered to the direct to consumer facility 290, the pharmaceutical items 244b can be removed from the tote 243, placed in inventory, and the tote 243 can be returned to the pharmaceutical wholesale distributor 282. A pharmacist at the direct to consumer facility 290 can then facilitate shipment of one or more of the pharmaceutical items 244b to a customer's home 294 to fulfil the customer's prescription. The shipment to the customer's home 294 can be tracked with a tracking device (e.g., 20) that generates a chain of custody log for the items in the shipment. When the shipment reaches the customer's home 294, the chain of custody log can be uploaded to a remote server (not shown) (e.g., via a remote computing device) and the tracking device can be returned to the direct to consumer facility 290. It is to be appreciated that although the chain of custody logs and other data are described as being uploaded to a remote server upon delivery, the chain of custody logs and other data can be uploaded to the remote server periodically during shipment (e.g., via long-range communication).

As the remote server accumulates chain of custody logs for the different shipments of items along the pharmaceutical distribution channel (e.g., from the pharmaceutical manufacturer to the pharmacist (or the customer for the direct to consumer distribution channel)), an individual chain of custody can be generated for each item from the chain of custody logs (including the various conditions and alerts that were detected by the tracking devices after the item left the pharmaceutical manufacturer). By establishing a unique chain of custody for each item, a pharmaceutical manufacturer can control and maintain the supply chain more effectively, more cost effectively, and more efficiently than current pharmacy supply chains.

Figure 11:
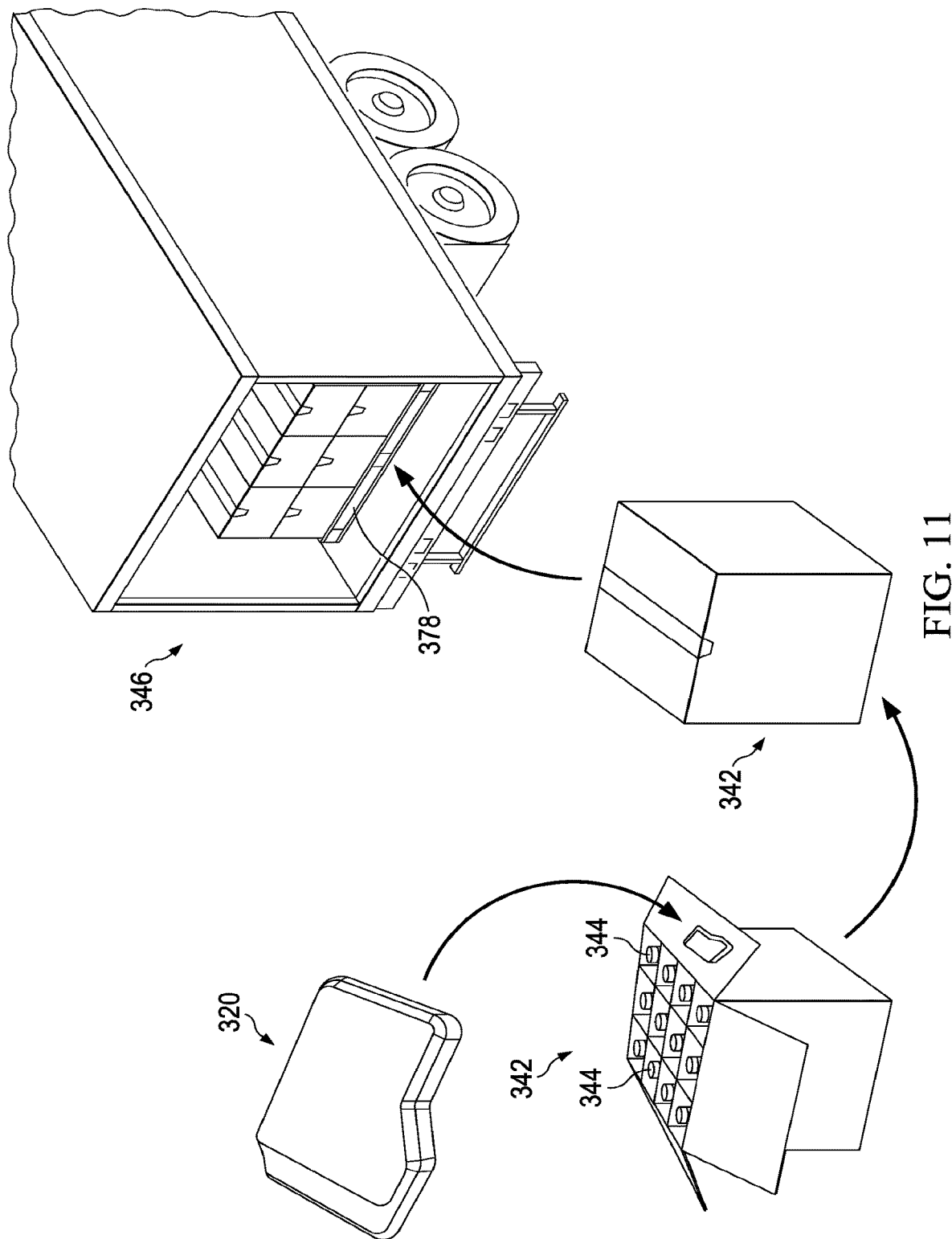
FIG. 11 is an environmental view depicting different stages of a method for tracking wine from a vintner with a tracking device.

Referring now to FIG. 11, one example of method for tracking wine from a vintner is illustrated and will now be discussed. It is to be appreciated that the method for tracking wine can incorporate similar tracking techniques as described above with respect to the tracking devices 20, 120. For example, first, wine bottles 344 can be provided in a parcel 342 along with a tracking device 320 that is similar to, or the same in many respects as, the tracking devices 20, 120 illustrated in FIGS. 1-6C and 7-9G, respectively. The tracking device 320 can be affixed to the parcel 342 and the parcel 342 can be closed for shipping. The parcel 342 can be palletized on a pallet 378 with other parcels and provided in a delivery vehicle 346 for delivery to a retailer. During shipping of the parcel 342 to a retailer, the tracking device 320 can track the parcel 342 and the temperature inside of the parcel. When the parcel 342 is delivered to the destination location, the tracking device 320 can upload data gathered during the shipment (e.g., a historical temperature report) to a remote computing device.

Figure 12:
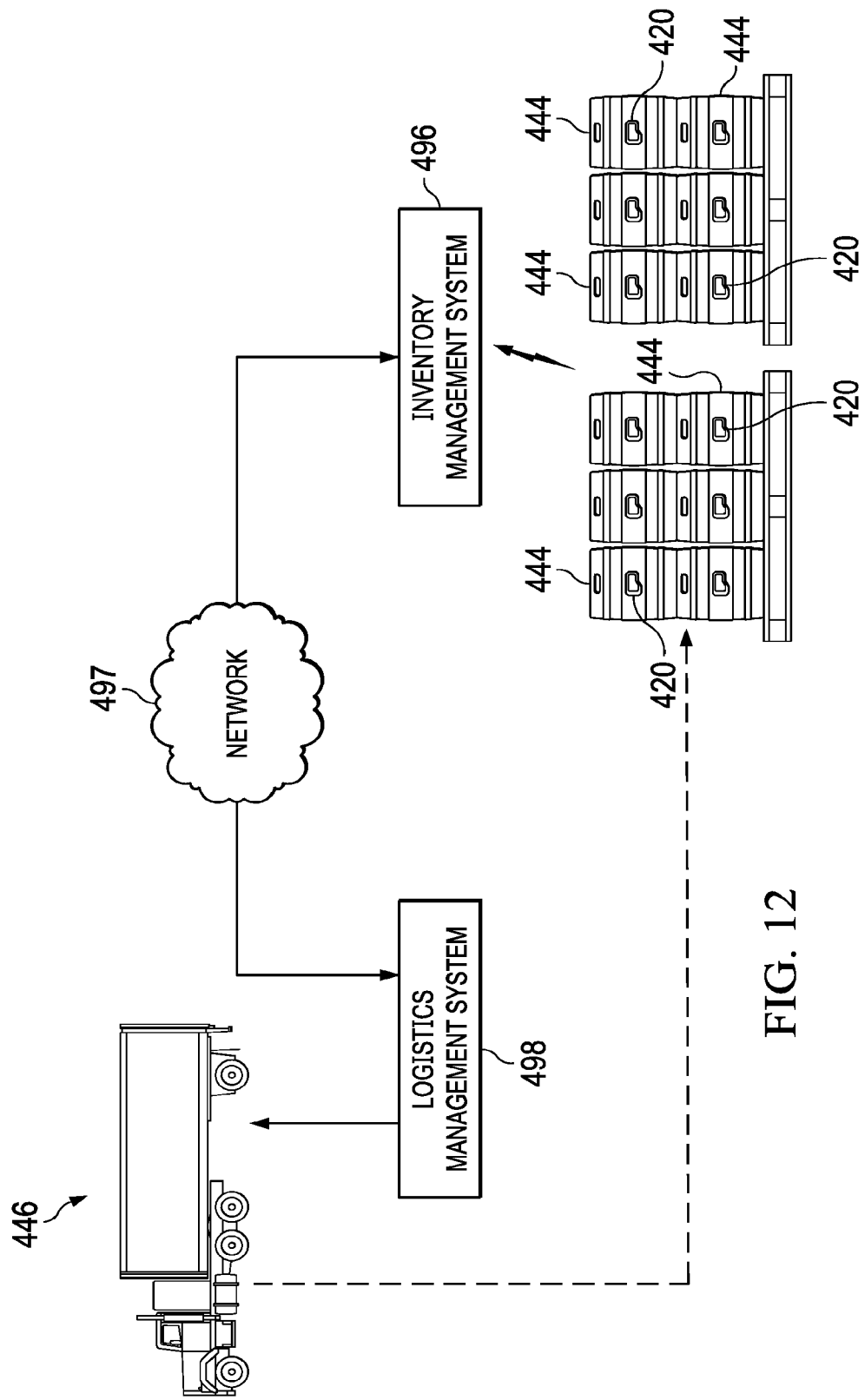
FIG. 12 is a schematic view depicting a method for tracking returned beer kegs with a tracking device.

Referring now to FIG. 12, one example of a method for tracking beer kegs 444 that have been returned to a distributor is illustrated and will now be described. Each beer keg 444 can be provided with a tracking device 420 that is similar to, or the same as in many respects as, the tracking devices 20, 120 illustrated in FIGS. 1-6C and 7-9G, respectively. When beer kegs 444 are returned to the distributor, an inventory management system 496 at the distributor can detect their arrival via the tracking device 420. Once enough of the beer kegs 444 have been returned to the distributor to fill a delivery vehicle 446, a notification is transmitted via a network 497 to a logistics management system 498 that can arrange for a delivery vehicle 446 to pick up the beer kegs 444 for delivery to a refiller (e.g., a brewer). The refiller can accordingly track their deployed beer keg inventory more precisely and can retrieve the returned beer kegs more promptly than with conventional inventory management systems. As such, less of the refiller's inventory remains with the distributors, which can allow the refiller to have a smaller inventory of beer kegs thereby providing a cost savings to the refiller.

It is to be appreciated that, although tracking devices are described for use in the pharmaceutical, wine and beer industries, the tracking devices (e.g., 20, 120) can be utilized in any of a variety of other distribution chains for tracking the shipment of products. It is also to be appreciated that the tracking devices described herein provide a cost effective solution that provides multiple different tracking features in a single device. The tracking device can give a shipper the ability to track the shipping of high value, vulnerable, regulated products (e.g., pharmaceuticals), the ability to detect and recover stolen goods, and/or the ability to detect shock, vibration, temperature and other environmental conditions substantially in real time during delivery more cost effectively than conventional arrangements. In addition, the tracking devices can enable a shipper to control their supply chain more effectively than conventional methods. For example, a shipper can use the tracking devices to identify the specific parcels that may have been damaged during a shipment (e.g., due to the occurrence of a hazardous condition) and remove the individual parcels from the supply chain rather than removing an entire shipment. A shipper can also use the tracking device to predict the occurrence of a hazardous condition might occur (e.g., increasing temperatures) and take mitigating action to prevent the hazardous condition from occurring. In addition, a shipper can use the data gathered by the tracking devices for different shipments to assess the compare the efficacy of a particular shipping method over another shipping method (e.g., to select the best vendor for a particular shipping method). In yet another example, a shipper can use the tracking devices to facilitate prevention and detection of counterfeiting.

It is to be appreciated that the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

A "computer," "remote computer," "remote computing device," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for tracking a container, the method comprising:
    associating a tracking device with the container;
    identifying a destination location for the container;
    detecting, by the tracking device, a current location of the container;
    detecting, by the tracking device, an environmental condition associated with the container;
    comparing the environmental condition to a predefined threshold;
    transmitting a first alert in response to the comparing of the environmental condition to the predefined threshold;
    determining, by the tracking device, that the container has been opened;
    determining, based upon the current location, whether the container has been opened at a location other than the destination location; and transmitting a second alert in response to the determining that the container has been opened at a location other than the destination location.

2. The method of claim 1 wherein the environmental condition comprises temperature.

3. The method of claim 1 wherein the environmental condition comprises vibration.

4. The method of claim 1 wherein the environmental condition comprises shock.

5. The method of claim 1 wherein the comparing the environmental condition to the predefined threshold is performed by the tracking device.

6. The method of claim 5 wherein the transmitting the first alert is performed by the tracking device.

7. The method of claim 6 wherein the environmental condition comprises temperature.

8. The method of claim 6 wherein the environmental condition comprises vibration.

9. The method of claim 6 wherein the environmental condition comprises shock.

10. The method of claim 6 wherein the determining that the container has been opened at a location other than the destination location is performed by the tracking device.

11. The method of claim 10 wherein the transmitting the second alert is performed by the tracking device.

12. The method of claim 1 wherein the determining that the container has been opened at a location other than the destination location is performed by the tracking device.

13. The method of claim 12 wherein the transmitting the second alert is performed by the tracking device.

14. The method of claim 13 wherein the tracking device transmits the second alert to a remote computing device, the method further comprising:
receiving, by the tracking device, an acknowledgement of the second alert from the remote computing device; and
terminating, upon receiving the acknowledgement, the transmitting of the second alert.

15. The method of claim 12 wherein the determining that the container has been opened at a location other than the destination location comprises:
detecting a light intensity inside of the container; and
determining that the light intensity exceeds a predefined threshold.

16. The method of claim 1 further comprising:
assigning a registry to the container;
detecting, by the tracking device, contents of the container;
comparing the contents of the container to the registry upon the determining that the container has been opened at a location other than the destination location; and
transmitting a notification to a remote computing device identifying results of the comparing the contents of the container to the registry.

17. The method of claim 16 wherein detecting the contents of the container comprises:
transmitting, by the tracking device, an interrogator signal to the contents of the container; and
receiving, by the tracking device, a response signal from a radio frequency identification tag located on an item of the contents of the container;
wherein the comparing the contents of the container to the registry comprises comparing a unique identifier from the radio frequency identification tag with a list of unique identifiers from the registry.

18. The method of claim 1 further comprising establishing a virtual geographic boundary for the destination location, wherein the determining that the container has been opened at a location other than the destination location comprises determining that the current location of the container is outside of the virtual geographic boundary.

19. The method of claim 1 wherein the determining that the container has been opened at a location other than the destination location comprises determining that geospatial information of the current location is outside of a predefined proximity of geospatial information of the destination location.

\* \* \* \* \*